US012579994B2

(12) United States Patent
    Sohail et al.

(10) Patent No.:  US 12,579,994 B2
(45) Date of Patent:      Mar. 17, 2026

(54) AUTOMATED CONVERSATION CONTENT ITEMS FROM NATURAL LANGUAGE

(71) Applicant: Meta Platforms Technologies, LLC, Menlo Park, CA (US)

(72) Inventors: Maheen Sohail, Brooklyn, NY (US); Hyunbin Park, Redwood City, CA (US); Ruoni Wang, Sunnyvale, CA (US); Vincent Charles Cheung, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/621,986

(22) Filed: Mar. 29, 2024

(65) Prior Publication Data

US 2024/0290342 A1     Aug. 29, 2024

Related U.S. Application Data

(63) Continuation of application No. 18/048,246, filed on Oct. 20, 2022, now Pat. No. 11,948,594, which is a
(Continued)

(51) Int. Cl.
    *G10L 21/10*          (2013.01)
    *G06N 20/00*          (2019.01)
    (Continued)

(52) U.S. Cl.
    CPC .............. *G10L 21/10* (2013.01); *G06N 20/00* (2019.01); *G10L 15/197* (2013.01); *G10L 15/26* (2013.01); *H04M 11/10* (2013.01); *G06Q 50/01* (2013.01)

(58) Field of Classification Search
    CPC ....... G10L 21/10; G10L 15/197; G10L 15/26; H04M 11/10
    (Continued)

(56) References Cited

U.S. PATENT DOCUMENTS 7,869,658 B2     1/2011  Blose et al.
10,318,574 B1    6/2019  Bonechi et al.
             (Continued)

FOREIGN PATENT DOCUMENTS

EP          1681640 A2      7/2006
WO      WO-2023060111 A1 *  4/2023      ............. G06N 3/084

OTHER PUBLICATIONS

Y. Huang et al., "Leveraging Unpaired Text Data for Training End-To-End Speech-to-Intent Systems," ICASSP 2020—2020 IEEE International Conference on Acoustics, Speech and Signal Processing (ICASSP), Barcelona, Spain, 2020, pp. 7984-7988, doi: 10.1109/ICASSP40776.2020.9053281. keywords: {Training; (Y (Year: 2020).*
(Continued)

*Primary Examiner* — Bharatkumar S Shah
(74) *Attorney, Agent, or Firm* — Seyfarth Shaw LLP

(57)              ABSTRACT

A conversation augmentation system can automatically augment a conversation with content items based on natural language from the conversation. The conversation augmentation system can select content items to add to the conversation based on determined user "intents" generated using machine learning models. The conversation augmentation system can generate intents for natural language from various sources, such as video chats, audio conversations, textual conversations, virtual reality environments, etc. The conversation augmentation system can identify constraints for mapping the intents to content items or context signals for selecting appropriate content items. In various implementations, the conversation augmentation system can add selected content items to a storyline the conversation describes or can augment a platform in which an unstructured conversation is occurring.

17 Claims, 18 Drawing Sheets

Related U.S. Application Data continuation of application No. 16/894,690, filed on Jun. 5, 2020, now Pat. No. 11,508,392.

(51) Int. Cl.
| | |
|---|---|
| *G10L 15/197* | (2013.01) |
| *G10L 15/26* | (2006.01) |
| *H04M 11/10* | (2006.01) |
| *G06Q 50/00* | (2012.01) |

(58) Field of Classification Search
USPC ......................................................... 704/235
See application file for complete search history.

(56)                References Cited

U.S. PATENT DOCUMENTS

| | | | |
|---|---|---|---|
| 10,324,973 | B2 | 6/2019 | Circlaeys et al. |
| 10,600,406 | B1* | 3/2020 | Shapiro .................... G10L 15/22 |
| 11,093,691 | B1* | 8/2021 | Mossoba ............... G06F 40/117 |
| 11,397,759 | B1 | 7/2022 | Park et al. |
| 11,508,392 | B1 | 11/2022 | Sohail et al. |
| 11,934,445 | B2 | 3/2024 | Sohail et al. |
| 11,948,594 | B2 | 4/2024 | Sohail et al. |
| 12,033,258 | B1 | 7/2024 | Sohail et al. |
| 2003/0144055 | A1 | 7/2003 | Guo et al. |
| 2005/0027712 | A1 | 2/2005 | Gargi et al. |
| 2005/0097120 | A1 | 5/2005 | Cooper et al. |
| 2006/0153460 | A1 | 7/2006 | Kim et al. |
| 2012/0265819 | A1 | 10/2012 | McGann et al. |
| 2012/0290950 | A1 | 11/2012 | Rapaport et al. |
| 2014/0161356 | A1 | 6/2014 | Tesch et al. |
| 2015/0382047 | A1 | 12/2015 | Van Os et al. |
| 2016/0026919 | A1 | 1/2016 | Kaisser et al. |
| 2016/0117347 | A1 | 4/2016 | Nielsen et al. |
| 2016/0357872 | A1 | 12/2016 | Fader et al. |
| 2016/0371276 | A1 | 12/2016 | Furtado et al. |
| 2017/0169101 | A1 | 6/2017 | Walia et al. |
| 2017/0242886 | A1 | 8/2017 | Jolley et al. |
| 2017/0293610 | A1 | 10/2017 | Tran |
| 2018/0018372 | A1 | 1/2018 | Franke |
| 2018/0024989 | A1 | 1/2018 | Bharti et al. |
| 2018/0136615 | A1 | 5/2018 | Kim et al. |
| 2018/0173698 | A1 | 6/2018 | Dubey et al. |
| 2019/0042988 | A1 | 2/2019 | Brown et al. |
| 2019/0087500 | A1 | 3/2019 | Danyluk et al. |
| 2019/0108286 | A1 | 4/2019 | Pan et al. |
| 2019/0189019 | A1 | 6/2019 | Hammersley et al. |
| 2019/0251716 | A1 | 8/2019 | Nelson |
| 2020/0117858 | A1 | 4/2020 | Freeman et al. |
| 2020/0125575 | A1 | 4/2020 | Ghoshal et al. |
| 2020/0233893 | A1 | 7/2020 | He et al. |
| 2020/0357382 | A1 | 11/2020 | Ogawa et al. |
| 2020/0372075 | A1 | 11/2020 | Rogynskyy et al. |
| 2021/0136205 | A1 | 5/2021 | Adibi et al. |
| 2021/0150541 | A1 | 5/2021 | Gurbuxani et al. |
| 2021/0158071 | A1 | 5/2021 | Yoshida et al. |
| 2021/0203784 | A1* | 7/2021 | Konig .................... G06Q 30/02 |
| 2021/0256452 | A1 | 8/2021 | Lavigne et al. |
| 2021/0304468 | A1* | 9/2021 | Doggett ............... G11B 27/031 |
| 2021/0405908 | A1 | 12/2021 | Bassett |
| 2022/0179665 | A1 | 6/2022 | Rathod |
| 2022/0199079 | A1 | 6/2022 | Hanson et al. |
| 2022/0335026 | A1 | 10/2022 | Park et al. |
| 2022/0335538 | A1 | 10/2022 | Park et al. |
| 2023/0206940 | A1* | 6/2023 | Aravamudan .......... G10L 25/54 707/759 |

OTHER PUBLICATIONS

Y. Huang et al., "Leveraging Unpaired Text Data for Training End-To-End Speech-to-Intent Systems," ICASSP 2020—2020 IEEE International Conference on Acoustics, Speech and Signal Processing (ICASSP), Barcelona, Spain, 2020, pp. 7984-7988, doi: 10.1109/ICASSP40776.2020.9053281. keywords: {Training; ( (Year: 2020).*
Bhargava A., et al., "Easy Contextual Intent Prediction and Slot Detection," IEEE International Conference on Acoustics, Speech and Signal Processing, 2013, pp. 8337-8341, DOI: 10.11 09/ICASSP. 2013.6639291.
D'Haro L.F., et al., "Automatic Ranking of Swear Words using Word Embeddings and Pseudo-Relevance Feedback," 2015 Asia-Pacific Signal and Information Processing Association Annual Summit and Conference (APSIPA), Dec. 2015, pp. 815-820.
International Preliminary Report on Patentability for International Application No. PCT/US2021/063400, mailed Jul. 13, 2023, 9 pages.
International Search Report and Written Opinion for International Application No. PCT/US2021/063400, mailed Mar. 9, 2022, 10 pages.
International Search Report and Written Opinion for International Application No. PCT/US2022/023261, mailed Jul. 15, 2022, 8 pages.
Lee L.S., et al., "Spoken Content Retrieval-Beyond Cascading Speech Recognition with Text Retrieval," IEEE/ACM Transactions on Audio, Speech, and Language Processing, Sep. 2015, vol. 23, No. 9, pp. 1389-1420, DOI: 10.1109/TASLP.2015.2438543.
Wang Y.C., et al., "Can You be More Social? Injecting Politeness and Positivity into Task-Oriented Conversational Agents," arXiv: 2012.14653v1, Dec. 29, 2020, 13 pages.

* cited by examiner

100

101
102
103

Input
Devices
120

Display
130

Other I/O
140

Processors
110

Memory
150

Program Memory 160

Operating System
162

Conversation Augmentation
System 164

Other Applications
166

Data Memory
170

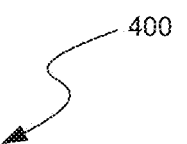
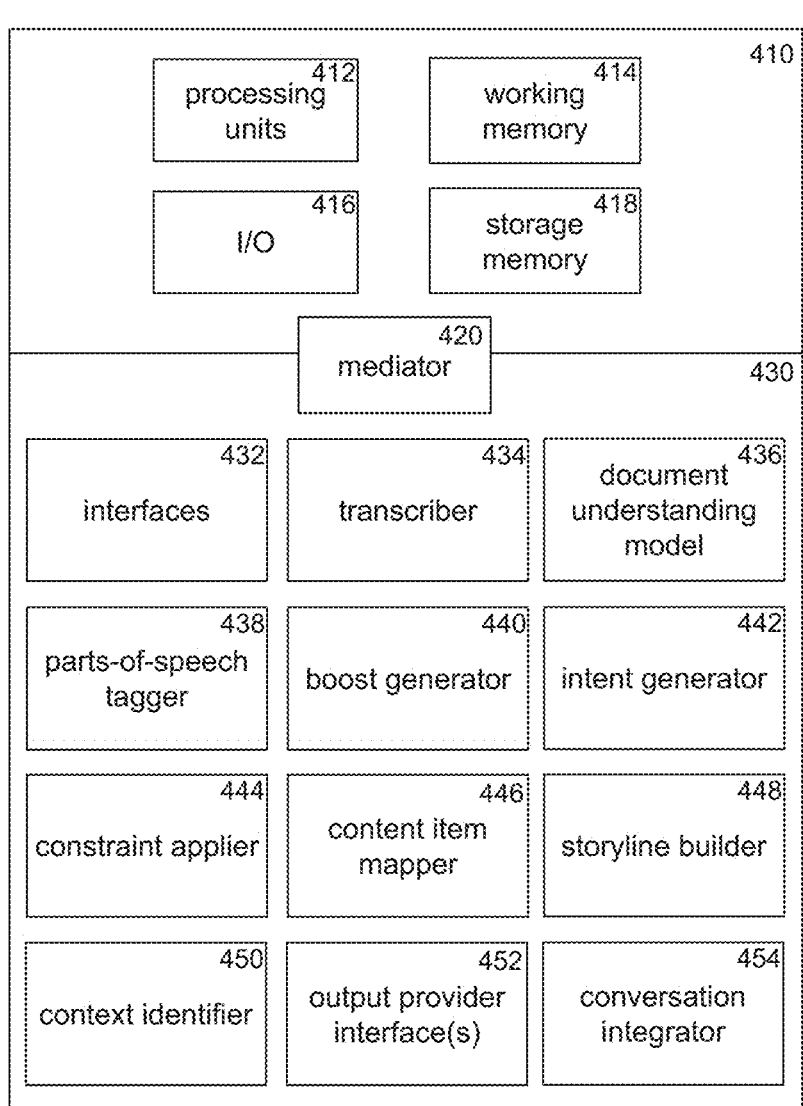
FIG. 4

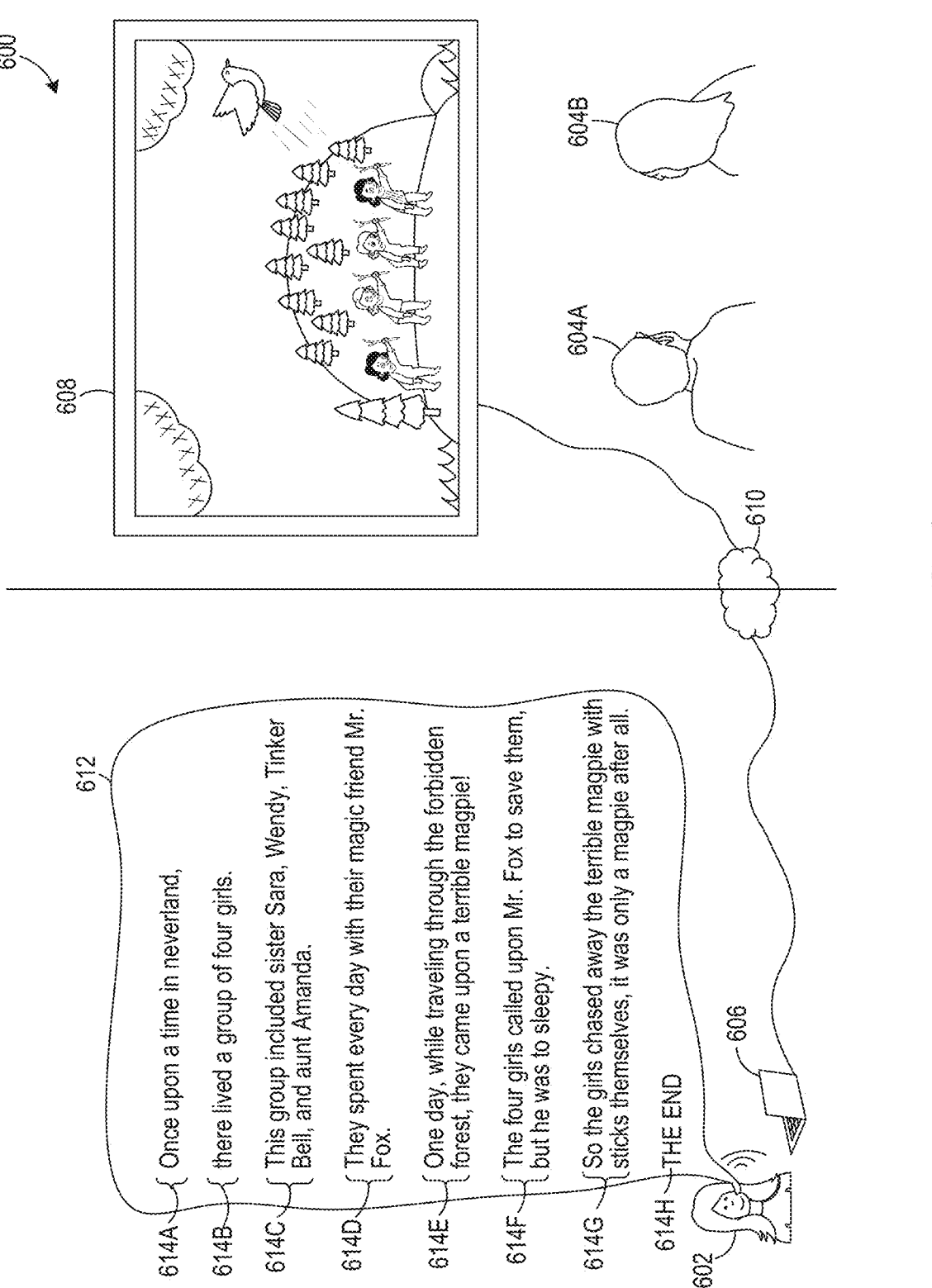

600

608

604B

604A

610

612

614A Once upon a time in neverland, 614B there lived a group of four girls.

614C This group included sister Sara, Wendy, Tinker Bell, and aunt Amanda.

614D They spent every day with their magic friend Mr. Fox.

614E One day, while traveling through the forbidden forest, they came upon a terrible magpie!

614F The four girls called upon Mr. Fox to save them, but he was to sleepy.

614G So the girls chased away the terrible magpie with sticks themselves, it was only a magpie after all.

614H THE END

Transcriber

776

778

614E

Natural Language Segment

One day while traveling through the forbidden forest, they came upon a terrible magpie!

724

Storyline Creator

780

782

728

732

Storyline

Scene: 2
Universe: peter pan
Setting: Island, forest
Main Character: girls x4 (Sister Sara, Wendy, Tinker Bell, Aunt Amanda)
Atmosphere: Dark
Adversary: Magpie

730

AUTOMATED CONVERSATION CONTENT ITEMS FROM NATURAL LANGUAGE

CROSS-REFERENCE TO RELATED APPLICATIONS

This application is a continuation of U.S. application Ser. No. 18/048,246, titled "Automated Conversation Content Items from Natural Language", filed on Oct. 20, 2022, currently pending, which is a continuation of U.S. application Ser. No. 16/894,690, titled "Automated Conversation Content Items from Natural Language", filed on Jun. 5, 2020, now U.S. Pat. No. 11,508,392, issued on Nov. 22, 2022, all of which are herein incorporated by reference in their entirety.

TECHNICAL FIELD

The present disclosure is directed to automatically augmenting a conversation with content items selected using machine learning interpretations of natural language from the conversation.

BACKGROUND

People typically use visuals and other content items such as hand gestures, whiteboard drawings, pictures, presentation slides, videos, audio, charts, etc., to facilitate understanding and engagement in a conversation. Such content items, however, often take a significant amount of time and effort to create. In some cases, a conversation participant does not have the time, skill, and/or confidence required to create such content items.

Stories can be particularly difficult to illustrate as they can portray multiple characters, settings, interactions between characters, and a general sequential structure. Creating conversation content items for stories is often beyond the ability or time constraints of many users.

In other cases, conversations can be unstructured. While individual content items for such conversations can be more readily available than whole storylines, identifying these content items and selecting between them can be a very difficult challenge. This is particularly true when the conversation is conducted via technological mediums such the telephone, video chat, instant messaging, virtual or augmented reality environments, etc. Further, in some cases, these digital environments do not provide easy interfaces for adding content items. In other cases, creating content for such digital environments requires creating digital content using advanced editing tools and ensuring that they conform to the digital environment—a task outside the skillset of many users.

BRIEF DESCRIPTION OF THE DRAWINGS

FIG. 4 is a block diagram illustrating components which, in some implementations, can be used in a system employing the disclosed technology.

FIG. 6 is a conceptual diagram illustrating an example of real-time generation of a storyline of content items based on natural language audio.

The techniques introduced here may be better understood by referring to the following Detailed Description in conjunction with the accompanying drawings, in which like reference numerals indicate identical or functionally similar elements.

DETAILED DESCRIPTION

Figure 1:
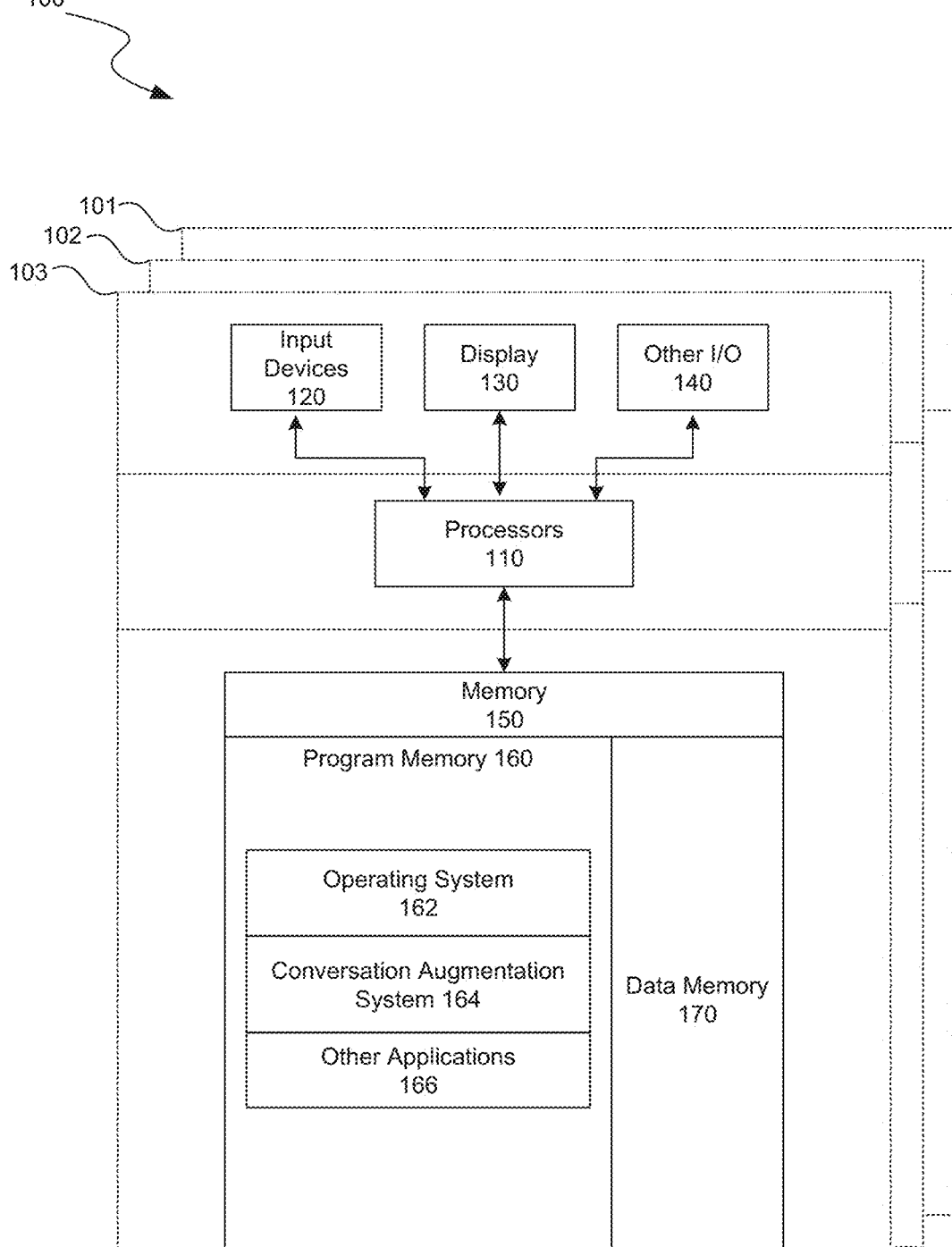
FIG. 1 is a block diagram illustrating an overview of devices on which some implementations of the present technology can operate.

Aspects of the present disclosure are directed to automatically augmenting a conversation with content items based on natural language from the conversation. A conversation augmentation system can select content items to add to the conversation based on, among other things, determined user "intents" generated using machine learning models. The conversation augmentation system can generate intents for natural language from various sources, such as video chats, audio conversations, textual conversations, virtual reality environments, etc. The conversation augmentation system can identify constraints for mapping the intents to content items or context signals for selecting appropriate content items. Further, the conversation augmentation system can add selected content items to a platform in which the conversation is occurring.

As used herein, a conversation can be any instance that produces natural language segments (e.g., phrases of one or more words) from one or more people. A conversation can exist between multiple users or can be in the context of a single user (e.g., where a user is speaking to a device). In some implementations, the conversation can be an unstructured conversation where conversation participants can be discussing any topic or providing any input. In other implementations, the conversation can be structured, such as where one or more of the conversation participants is telling a story. In various implementations, conversations can be synchronous or asynchronous.

Platforms through which conversations occur or from which natural language segments are otherwise obtained are collectively referred to herein as "natural language interfaces." For example, natural language interfaces can be video chat applications, social media platforms, artificial reality systems, telephone or other audio conversation systems, instant message applications, etc. In general, natural language interfaces can include one or more input modalities (e.g., text, audio, video) and various graphical user interfaces ("GUIs") or audio interfaces, e.g., for displaying video, images, or text or playing sound. In some implementations, these natural language interfaces can have designated components for outputting content items automatically selected for the natural language segments. For example, a video chat application can have a window dedicated to showing such content items or a virtual reality system can provide object containers at designated locations. In other implementations, natural language interfaces can integrate selected content items into existing aspects of the conversation, e.g., by providing an overlay on a video chat, interjecting an image or video into a text stream of an instant message conversation, or adding an object attached to a speaker in an artificial reality system.

In some implementations where the conversation augmentation system receives the natural language segments as audio, it can transcribe the audio into text. In various implementations, this transcription can be performed using existing transcription methods. In some implementations, these transcription methods can be altered with "boosts," which are phrases or topics for which the probability of being selected by a machine learning model is modified. A boost can be phrases (one or more words) or topics identified as more likely to occur in a given natural language segment. A boost can be selected by applying a contextual language model that receives one or more seed phrases and/or contextual information and produces associated phrases or topics. Examples of contextual information include signals associated with a user who provided the natural language segment (who is referred to as the "natural language provider"), such as location, age, gender, job, education, time, social media friends, etc. The context information can also include signals specifying a context of the natural language interface, such as whether the natural language interface is being used by the natural language provider for work or social conversations. In some implementations, the context signals can include input, from the natural language provider or another participant of the conversation, in different modalities, e.g., gestures or facial expressions identified by an artificial reality system. In some implementations, a contextual language model is a machine learning model trained to identify words that commonly appear in conjunction with other words and/or contextual signals. In other implementations, a contextual language model can be an interface to one or more language providers, such as a Wiki, social media platform, search engine, news outlet, etc.

In some implementations, the conversation augmentation system can select which language providers to use for determining boosts based on the contextual information. For example, contextual information can provide weights for selecting language providers or sets of contextual factors can be mapped to different language providers. As a more specific example, a natural language interface for a work setting can be mapped to an instant message language provider that searches a history of work conversations while a natural language interface used for social conversations can be mapped to a language provider that searches social media posts. The selected language providers can receive phrases and/or context signals from the conversation augmentation system and can provide related phrases or topics as boosts. The language providers can identify boosts using various models and heuristics, such as applying trained machine learning models, identifying frequencies of phrase co-occurrences in text corpuses, identifying counts of incoming and outgoing web links, using social media connections between people (e.g., "friends"), using content popularity, etc. In some implementations, the boosts can be provided with weights indicating an amount of similarity or dissimilarity to the seed phrases, indicating an amount a machine learning model should favor or disfavor the boost. In some implementations, boosts can be synonym groups. For example, if a seed phrase is "dog" and corresponding boost phrases are "cat" and "veterinarian," the "cat" boost can apply to synonyms such as "feline" and "kitty," while the "veterinarian" boost can apply to synonyms such as "vet" or "animal doctor." Such synonyms can be selected, for example, based on a traditional thesaurus or using phrases embedded into a semantic vector space and selecting vectors that are no more than a threshold cosine distance from the vector of the boost phrase.

The conversation augmentation system can select content items to add to the conversation based on determined user "intents." An intent can be a data structure that specifies at least one identified topic for a segment of natural language. In some implementations, an intent can also specify a relationship between topics based on relationships or categories identified for parts of the natural language segment. For example, in the natural language segment, "The girl lived in a castle and the girl was standing by a ponderosa," the conversation augmentation system can identify the three intents "female," "castle" and "tree." The conversation augmentation system may also identify "female" as a primary object based on "girl" being the subject of the natural language segment, "castle" as a location relating to the girl and therefore classify "castle" as a scene object, and a relationship of "close to" for "female" and "tree" based on the association of "by" between "girl" and "ponderosa" in the natural language segment.

In some implementations, the conversation augmentation system can identify intent topics and/or topic relationships using one or more machine learning models trained for this purpose. For example, a document understanding model can be trained to identify topics in a natural language segment while a parts-of-speech model can be trained to identify types of phrases and/or relationships between phrases. In some implementations, output from these machine learning models can feed into each other, such as the parts-of-speech tags being provided with the natural language segment to the document understanding model (or vice-versa). A document understanding model can be a machine learning model trained on associations between natural language segments and topics. In some implementations, the document understanding model training items can further provide relationships between natural language segment portions and relationships between natural language segment topics, allowing the trained document understanding model to generate the relationships between the topics for new natural language segments. In some implementations where the conversation augmentation system generates boosts for phrases, the document understanding model can be further trained to use these boosts to adjust probability distributions used as part of the document understanding model. For example, if the document understanding model received a natural language segment of "Jon was at the rock concert" and normally would (incorrectly) identify "boulder" as a topic for the natural language segment, but has a boost of −50% for the phrase "boulder," the document understanding model can decrease the likelihood of "boulder" being selected, making the model instead select a different "music show" topic for the natural language segment.

In some instances, the conversation augmentation system can be configured to create a storyline of content items based on one or more natural language segments. The conversation augmentation system can do this using, for example, constraints that define parameters for matching determined intents to content items. In some implementations, constraints can be based on a current intent, features from the natural language segment the intent was taken from, and/or previously identified aspects of the story. For example, if "Mary" was previously identified as the heroine of the story, when Mary is subsequently identified in an intent, the constraint of heroine can again be applied. As another example, if "Big Bad Wolf" was previously identified as the obstacle of the story, the obstacle role can be considered filled and a later intent for "fire" can be prevented from being identified as the obstacle of the story if the system is set up to have only one story obstacle at a time.

In some implementations, constraints are selected for one or more intents using a machine learning model. Training data for this machine learning model can use intents mapped to constraints through human labeling or through inferred labeling, e.g., based on user corrections to content items selected using the machine learning model or reactions to stories (e.g., stories that receive a high frequency of social media "likes" can imply that the constraint's uses were correctly selected). In some implementations, as discussed below in relation to FIG. 5, constraint selection can be based on other factors indicating certain constraint types, either as part of an algorithm or as further input to the machine learning model. Additional types and uses of constraints are also described in further detail below in relation to FIG. 5.

The conversation augmentation system can select content items for the storyline by matching the intent to content items that fall within the constraints. In some implementations, this matching can apply a machine learning model trained to take the topics and/or relationships of an intent and select content items. In some cases, the machine learning model can also take the constraints as input. For example, the set of constraints can be passed as a group to the machine learning model or selected constraints having different categories (e.g., content item topics, content item sources, content item characteristics, etc.) can be included in a sparse constraint vector in positions corresponding to the constraint type. In other cases, constraints can be applied separately from the machine learning model, e.g., to limit the set of possible content items from which the machine learning model can select. To selected content items in some cases, the machine learning model can map the intent into a vector space for content items, and then the conversation augmentation system can select one or more content items that have vectors within a threshold distance (e.g., using vector cosine distance) of the intent's vector. In some implementations, the mapping can use other or additional techniques such as category matching (e.g., selecting content items with metadata, such as category tags and/or relationships, that match the one or more intents). Such metadata can be determined for content items using machine learning techniques (e.g., object identification, keyword identifiers, emotion or mood identifiers, etc.) and/or can be supplied by human tagging of content items.

The system can also select content items using constraints that match to metadata (e.g., characteristic tags, action tags, object tags, emotion tags, etc.) In some implementations, one or more constraints can specify a source for the content item, e.g., from a set of photos associated with the natural language provider, from a content item store in a particular genre, or from content items associated with a particular existing universe. In some cases, a constraint can specify an output modality a content item must be compatible with to be selected. When these constraints are selected, the content item matching can be limited to content items from the specified source, prioritize content items from that source, or be limited to content items that can be output in the specified modality. For example, where a constraint specifies a personal indicator (e.g., "my mom") the content item selection can be limited to content items with a particular association with the natural language provider, or even that have the specified personal relationship (e.g., only select pictures from a social medial site where the images are associated with an entity with a "mother" relationship to the natural language provider on a social graph). As another example, where the constraint specifies an output modality of sound, an intent of "lion" can be matched to the sound file depicting a lion roaring. As yet another example, where the constraint specifies the Peter Pan universe, the conversation augmentation system can first attempt to match the intent to content items from that universe before attempting to find other matching content items.

In some instances, one or more constraints can specify a content item characteristic in a category (e.g., green in the category color, happy in the category emotion, etc.) and content item selection can be limited to content items that ether specify the content item characteristic or that can be modified in the category of the content item characteristic. For example, where a natural language segment is "the happy farmer went to town," an intent can be determined as "farmer" with a corresponding constraint of "happy," which is determined to be in the category of "emotional state" based on a mapping of content item characteristic constraints to categories. This constraint can limit content item selection to content items that are either tagged with a "happy" indicator or that can have a modifiable emotional state. For example, the conversation augmentation system can select a picture of a farmer that has particular replaceable features to make the farmer appear in different emotional states and can cause the features for "happy" to be applied to the farmer picture. Similarly, where a constraint specifies a feature of a story (such as character type, a setting/scenery type, adversary or challenge) the conversation augmentation system can limit content item selection to content items that have been identified as fitting with that story feature. Similarly for constraints that specify mood or atmosphere, content items can be selected that have an identifier matching the specified mood or atmosphere or that can be modified to match it.

The constraints discussed above can be used for the selection of content items. In other cases, constraints can specify how selected content items are to be incorporated in the storyline or modified for story incorporation. For example, storylines can have specified roles (e.g., main character, adversary or challenge, setting or location, supporting cast, props, etc.) and selected content items can have a constraint specifying how they match up with those roles. The conversation augmentation system can incorporate the selected content items into designated story scenes, into designated places in a scene, or in designated relationships to other scene roles based on the constraints for that content item. For example, a selected content item with a main character constraint can be placed in the opening scene of the story, featured prominently compared to a building designed as a setting for the story. Furthermore, constraints can specify how the content item is presented, such as through modification, duplication, orientation, etc. For example, a natural language segment "there were once three firemen" can produce an intent "firemen" with a count constraint of "three." The conversation augmentation system can use the intent to select a fireman image (or can select three versions of firemen images) and, based on the "three"

constraint, can display three copies of the image in the storyline. As discussed above, constraints can also cause the conversation augmentation system to modify selected content items to match the constraint, such as by changing their color, orientation, size, emotional aspect, atmosphere within the story, etc.

In some implementations, constraints can have types and the identified constraints can be applied according to a specified hierarchy of their types. For example, a natural language provider can have specified a constraint for the universe "Peter Pan" but then can also create an intent for "my twin." The conversation augmentation system can have a constraint hierarchy for constraints for personal relationships (causing a source selection from the natural language provider's social media pictures) to be before a constraint for a universe (causing a content item selection from a data source for the universe). Thus, in this example, the conversation augmentation system will select a picture of the natural language provider's twin from his social media profile instead of a drawing of one of the twins in the Peter Pan universe that also match the intent.

In some implementations, selected content items can be animated, either individually or as interactions between content items, based on intents and/or constraints. For example, a constraint can specify an emotional state for the main character of "crying" and the conversation augmentation system can select a content item matching the main character intent and can modify the content item to have animated tears rolling down its face. As another example, a first intent can specify a main character of "a prince" while a second character can specify an adversary of "a scary frog." The conversation augmentation system can select an image of a prince matching the first intent and can select a second content item, an image of a frog, matching the second intent. The conversation augmentation system can also identify a constraint for the second intent indicating the second intent acts on other content items in the scene with a "scary" relationship. This constraint can cause the conversation augmentation system to generate a corresponding animation for the first content item, e.g., animating the prince content item to run away from the frog content item.

As a natural language provider continues to provide natural language segments for the story, the above process can repeat, adding more content items to the storyline. As content items are selected for the storyline, they can fill in storyline parameters, based on the constraints that the content items correspond to. For example, the storyline can specify story parameters such as a setting, one or more main characters, one or more obstacles or adversaries, supporting characters, props, music/sound effects, mood or atmosphere, etc. Multiple storyline templates can be defined such that the storyline template with parameters best matching the intents provided so far can be used. Storyline parameters can be constant throughout the story or can be set on a scene by scene basis. Some parameters can be fixed once set while others can be updated based on additional natural language segments.

In some implementations, as a natural language provider provides new natural language segments, the intents determined for the new natural language segments can be based on the previous natural language segments. For example, if a first natural language segment is "my grandmother was flying a plane" and a subsequent natural language segment is "she landed it," the conversation augmentation system can determine that "she" refers back to a previously determined intent "grandmother" and "it" refers back to the previously determined intent "plane." In some implementations, these subsequent determinations can be accomplished using relationships identified in intents and/or corresponding constraints. Continuing the previous example, if the conversation augmentation system has specified "grandmother" as the primary character, it may also later determine that the reference to "she" is likely also referring to a primary character and, based on this determination, correlate the "she" intent with "grandmother." Similarly, how previous intents have been applied to the storyline can affect what story parameters later intents can fill. In some cases, one type of story parameter can have multiple instances, e.g., there can be multiple supporting characters which can be instantiated each time a new intent with a supporting character constraint is identified. In other cases, certain types of story parameters can have only one instance or only one instance for a particular scene, such as a setting parameter or an atmosphere parameter.

In some implementations, if a natural language provider is identified as being stuck in telling the story (e.g., based on a pause, use of particular phrases such as "Um" or "Uh," or an identified loss in cohesion to the story) the conversation augmentation system can prompt the user to provide missing story parameters. For example, if the user has yet to specify where the current scene is taking place or what the challenge is, the conversation augmentation system can prompt the user to provide natural language segments for these parameters.

When a natural language provider creates a story, in some cases that story can be saved, posted to social media, cast to various devices, transmitted over a network connection (e.g., as an augmentation to a video chat), etc. In some implementations, a shared story can be configured to allow others to view the story, to continue the story from where the first natural language provider left off, or to modify part of the story created by the first natural language provider.

As described above, the conversation augmentation system can automatically augment a conversation that describes a story with a storyline of content items selected using machine learning. In other implementations, the conversation augmentation system can augment an unstructured conversation with one or more content items based on one or more natural language segments of the conversation and/or a context of the conversation. As also discussed above, natural language segments can be obtained from an unstructured conversation and, if in audio format, transcribed. Such transcription can apply boosts to improve transcription results. Further, the boosts can be used to generate intents (topics and, in some cases, relationships between phrases) determined for the natural language segments.

In the case of unstructured conversations, the conversation augmentation system can interpret these intents using context signals associated with the conversation and/or the conversation participants. In various implementations, the context signals can specify one or more of the following: people associated with the conversation or with the conversation participants (e.g., friends, friends of friends, followers, co-members of groups, co-participants in events, users who have interacted with similar content, or other contacts on social media, such as can be determined from the social graph), a current time, locations for one or more of the conversation participants, a history of the conversation, a history of language used by the natural language provider, a history of content a the natural language provider interacted with, a type of relationship between the conversation participants (e.g., work, friend, acquaintance, anonymous, etc.), or other contextual information.

Using the intents from one or more natural language segments and the context signals, the conversation augmentation system can select one or more content items. In some implementations, for example, this selection is performed in a manner similar to selecting content items for storylines, i.e., by applying one or more machine learning models trained to map the intents into a vector space (which can also take the context signals as further input, such as in a sparse vector) and select content items mapped to the vector space closest to the vector for the intent or within a threshold distance of the vector for the intent.

In other implementations, the intents and/or context signals can be provided to one or more "output providers" to select one or more corresponding content items. Output providers are services that supply content items based on search parameters. In various implementations, the output providers can be controlled by the conversation augmentation system or can be systems external to the conversation augmentation system. Examples of output providers include image search services, geographic map providers, one or more websites associated with the conversation or services that pull content items from such websites, a data storage system associated with an employer of one or more of the conversation participants, social media services, cloud storage providers (public or private to one or more of the conversation participants), etc. In some implementations, the conversation augmentation system can have a set of output providers it uses for all unstructured conversations. In other implementations, the conversation augmentation system can select which output providers to use for the current intents based on a mapping of (A) a category determined for one or more of the intents and/or one or more values from the context signals to (B) particular output providers. For example, where the context signals specify the conversation is a workplace conversation, an output provider mapped to workplaces, or mapped to the particular workplace, can be selected. As another example, where the intent lists "pizza" the conversation augmentation system can determine that "pizza" falls into the categories of "food" and "restaurant," select a geographical mapping provider mapped to the "restaurant" category, and select both a review service and a search engine that are mapped to the "food" category.

Where the output providers provide more content items than can be provided in the natural language interface of the conversation, the conversation augmentation system can rank the received content items to determine which should be output to the conversation participants. For example, the conversation augmentation system can apply a machine learning model to generate a score for each content item in relation to the current intent(s) and can select the content items that have the highest score.

Selected content items can be provided in the natural language interface of the conversation. Where the natural language interface is a 2D screen, the content items can be shown, for example, in a designated window, as an overlay to the conversation, incorporated in a text thread of the conversation, etc. As another example, where the natural language interface is an artificial reality environment, selected content items can be provided as objects in the environment, e.g., in spatial relation to the natural language provider. In some implementations, the artificial reality environment can be configured to provide content items of different types in specified ways, such as by providing a virtual web browser to show websites, showing a virtual table with a 3D map for geographical maps, converting videos into 3D environments for the user to view and enter, etc. In 2D or 3D cases or for audio, haptic or other output modalities, the content items can be displayed in any manner specified by the content item or the natural language interface, e.g., as images, tables, maps, links to the source of the content items, videos, played as sounds, etc. In various implementations, a content item can be provided automatically to all conversation participants or can first be provided to the natural language provider that produced the natural language segment that resulted in the content item, allowing the natural language provider to select whether to provide it to other participants. This can allow the natural language provider to screen content items, particularly where a content item was selected from a source private to the natural language provider, such as her social media pictures or cloud storage. In some implementations, the conversation augmentation system can analyze provided content items to determine parts of the content items that best match the intents and can highlight or otherwise accentuate the relevant portions.

As the conversation progresses, other content items can be selected to replace or add to previous content items selected for the conversation. As with story conversations, subsequent selections of content items can be influenced by previous selected content items, determined intents, and/or context signals. For example, if a first natural language provider provides the natural language segment "let's go eat," a "go eat" intent can be determined, causing a map content item to be displayed with local restaurants. If another natural language provider then provides the natural language segment "I like Italian," the conversation augmentation system can determine an intent "Italian" but limit the corresponding new content items to a map to match the previous selected content item, causing the output content items to update to a map of local Italian restaurants.

As used herein, a "content item" can be any perceivable digital output such as text, images, audio, video, links, maps, webpages, charts, tables, animations, 3D objects, or other multi-media, haptic feedback, etc. In various implementations, content items can be social network items or parts of social network items, such as posts, likes, photos, videos, mentions, news items, events, shares, comments, messages, etc.

As also used herein, a machine learning model can be one or more types of models trained using various supervised, semi-supervised, or unsupervised training methods. A machine learning model can be trained on training data to make predictions or provide probabilities for new data items, whether or not the new data items were included in the training data. For example, training data for supervised learning can include items with various parameters and an assigned classification. Once trained, a new data item can have parameters that a model can use to assign a classification to the new data item. For example, training items can be one or more topics associated with a phrase, used to train a machine learning model to assign topics to new phrases. In some implementations, a model can be a probability distribution resulting from the analysis of training data, such as a likelihood of a word corresponding to an input sounds based on an analysis of a large corpus of language items. Examples of models include: neural networks, deep neural networks, support vector machines, decision trees, Parzen windows, Bayes, clustering, reinforcement learning, probability distributions, and others. Models can be configured for various situations, data types, sources, and output formats.

Various types of neural network models can have multiple input nodes that receive input, such as sounds, representations of phrases, context signals, etc. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input. For example, selecting a most likely transcription for an input sound, specifying topics for input phrases, identifying relationships between parts of input phrases, etc. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

Various illustration, animation, sound editing, and presentation programs allow users to manually create and share stories, while messaging, video chat, phone, and other programs allow users to conduct conversations and select content items to share during the conversation. However, these systems often require significant expertise to create content items for stories or other conversations. Even where content items for a conversation already exits, existing systems requiring significant user time and initiative to find and select such content items to share. The conversation augmentation system and processes described herein overcome these problems associated with conventional conversation techniques and are expected to provide users with greater ability to effectively communicate through digital channels such as voice chat, video chat, instant message, or artificial reality. The conversation augmentation system and processes can automatically generate storylines matching natural language from a user conversation in a manner that was previously inaccessible to most users, either due to a lack of ability to use the necessary editing programs and/or due to a lack of time to make such stories. Through automatic generation of user intents specified in natural language statements and matching these intents to content items, using sophisticated selection and application of constraints and context signals, conversations that employ the conversation augmentation system can be more informative and effective, faster, and more engaging. The conversation augmentation system and processes described herein are rooted in computerized machine learning systems, instead of being an analog of content editing and/or content sharing systems. For example, existing content editing and sharing systems require significant manual selections to create content items or even to find content items matching the conversation. The conversation augmentation system, to the contrary, allows a user to merely speak or type, and have relevant content items created in a storyline or as an augmentation to an unstructured conversation.

Several implementations are discussed below in more detail in reference to the figures. FIG. 1 is a block diagram illustrating an overview of devices on which some implementations of the disclosed technology can operate. The devices can comprise hardware components of a computing system 100 that can automatically augment a conversation with content items based on natural language from the conversation. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, conversation augmentation system 164, and other application programs 166. Memory 150 can also include data memory 170 that can include data which can be provided to the program memory 160 or any element of the computing system 100.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
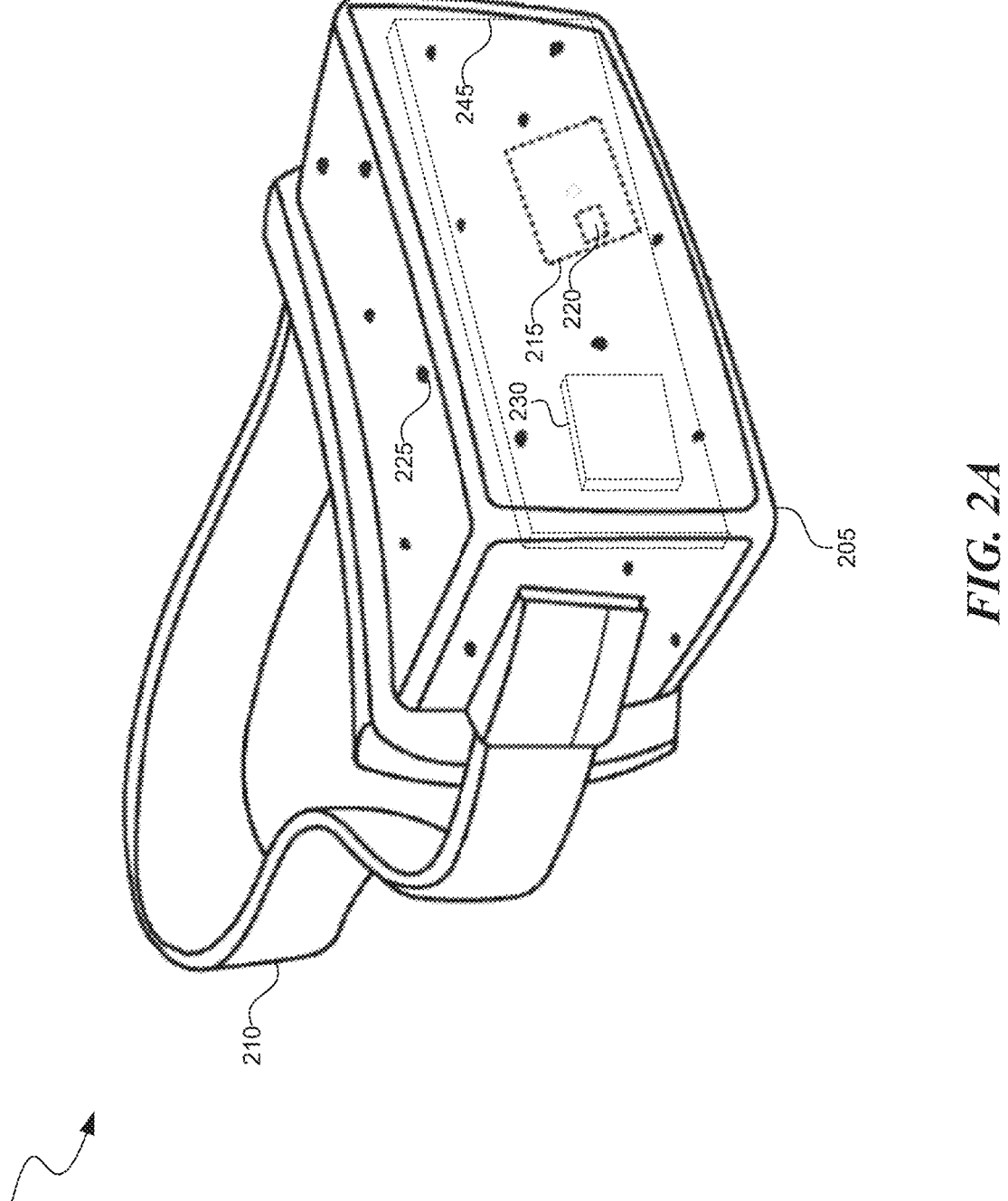
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
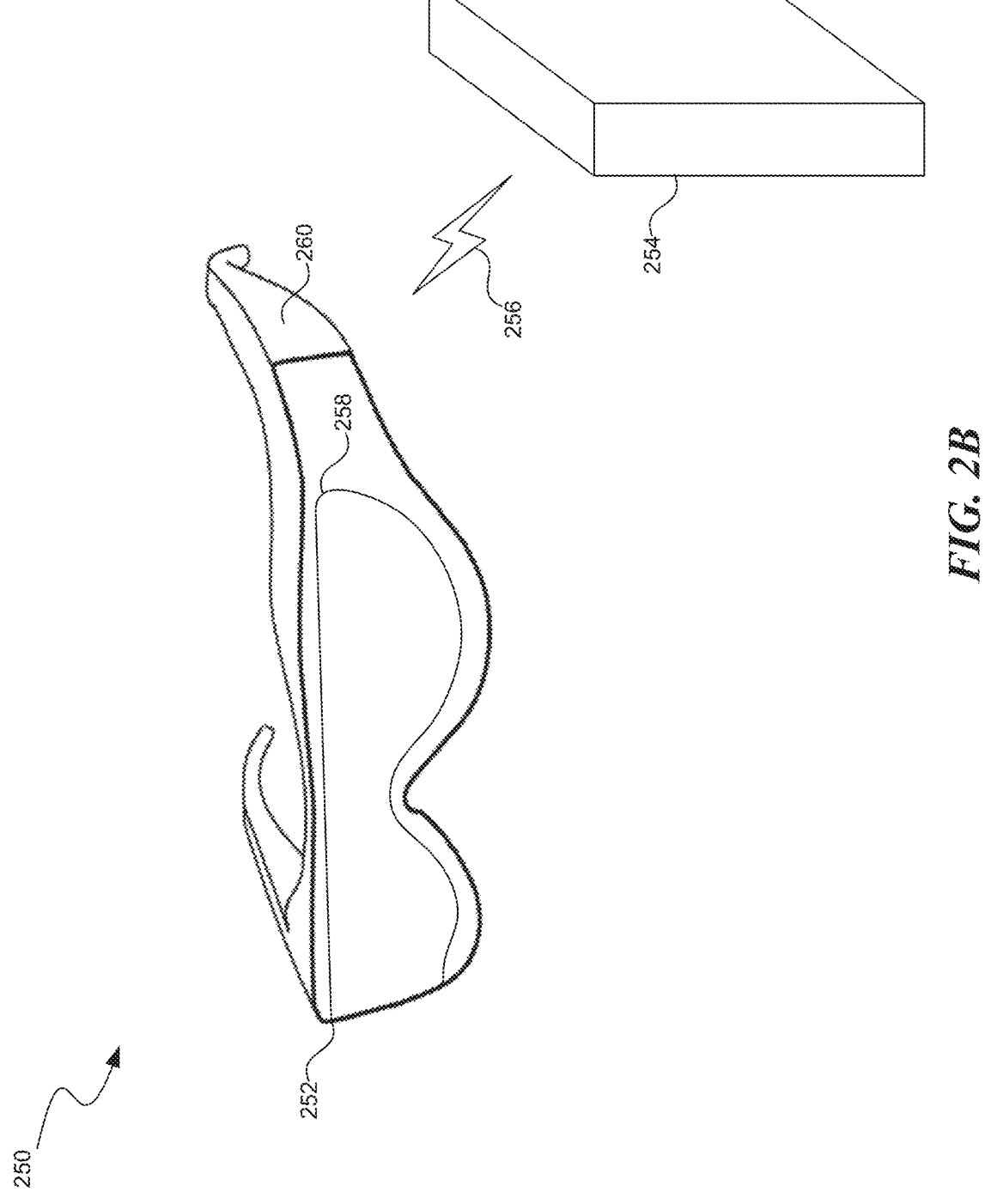
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
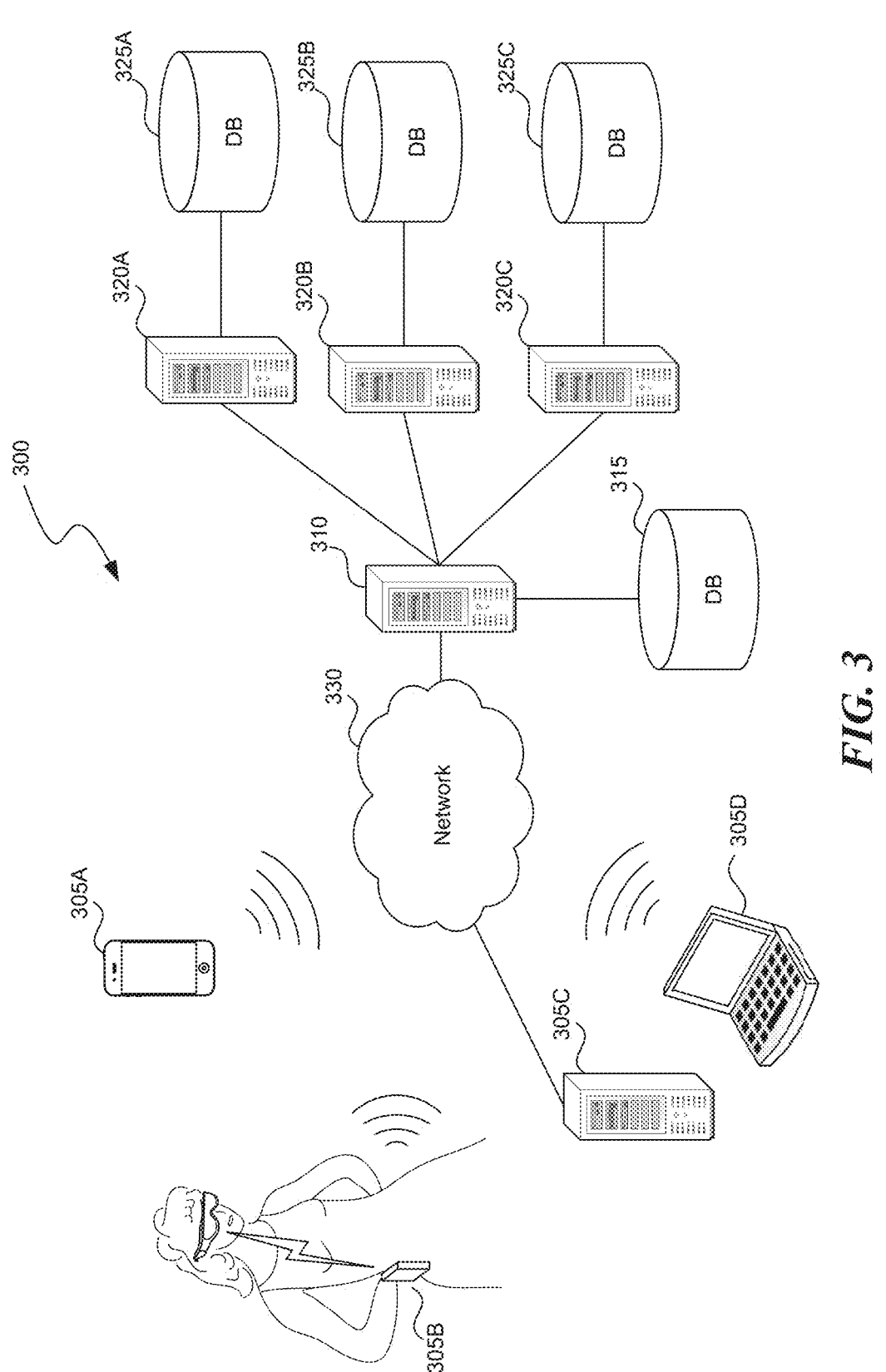
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to interact with one or more other users e.g., via email, instant message, text/SMS message, video chat, virtual reality spaces, ect. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their personalized avatar) with objects or other avatars in a virtual environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for automatically augmenting a conversation, either by creating a storyline or selecting content items for an unstructured conversation. Specialized components 430 can include, for example, transcriber 434, document understanding model 436, parts-of-speech tagger 438, boost generator 440, intent generator 442, constraint applier 444, content item mapper 446, storyline builder 448, context identifier 450, output provider interface(s) 452, conversation integrator 454, and components and APIs that can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430.

Transcriber 434 can receive audio of a natural language segment and convert it to text. In various implementations, transcriber 434 can utilize existing transcription libraries or services to perform this conversion. In some implementations, transcriber 434 can use machine learning models or other probabilistic models for performing these transcriptions. In some cases, transcriber 434 can receive one or more boost phrases from boost generator 440, which can modify the probabilities (increase or decrease a specified amount) for boost phrases or that are synonyms of the boost phrases. These modified probabilities can be used by the machine learning models or other probabilistic models in selecting transcription phrases or intents. In some implementations, transcriber 434 can perform an initial pass on a natural angered segment to identify one or more phrases as seed phrases, which can be passed to boost generator 440 to identify the boosts. Additional details on transcribing natural language segments are provided below in relation to block 504 of FIG. 5, the description of transcriber 434 for FIGS. 7A-G and 10, and blocks 804 through 810 in FIG. 8.

Document understanding model 436 can receive a natural language segment, apply one or more machine learning models to it, and produce a data structure that represents one or more semantic meanings from the natural language segment. For example, document understanding model 436 can map the phrases from the natural language segment into an embedding space and produce corresponding semantic identifiers that are mapped in the embedding space within a threshold distance of the phrase. In some implementations, the machine learning models of the document understanding model 436 can also use parts-of-speech tags, from parts-of-speech tagger 438, as further input for determining the embedding of the natural angered segment phrases. Additional details on applying a document understanding model to a natural language segment are provided below in relation to block 510 of FIG. 5 and the description of document understanding model 436 for FIG. 7A.

Parts-of-speech tagger 438 can analyze a natural language segment and identify how various phrases within the natural language segment are used and how they relate to other phrases within the natural language segment. For example, parts of speech tagger 438 can identify a subject, an action, modifiers, etc. In some implementations, the parts of speech tagger 438 can identify these categories and relationships from existing labeling systems, such as the UPenn TreeBank parts-of-speech labeling system. In some implementations, parts of speech tagger 438 can use one or more machine learning models. In some implementations, the machine learning models can take semantic identifiers from the document understanding model 436 as input when being applied to identify parts of speech. Additional details on applying identifying parts-of-speech for a natural language segment are provided below in relation to block 508 of FIG. 5 and the description of parts-of-speech tagger 438 for FIG. 7A.

Boost generator 440 can receive one or more seed phrases from transcriber 434, and/or from alternate sources that have other information associated with the natural language provider, such as the natural language interface that recorded the natural language segment, a social media platform, a search platform, a geographical mapping platform, etc. The seed phrase can be a phrase from the natural language segment, a phrase associated with the natural language provider, a previous phrase from the conversation, phrases commonly used in a type of conversation corresponding to a type identified for the conversation (e.g., work conversations, planning conversations, family conversations, etc.), a phrase identified as commonly used by people with characteristics similar to the natural language provider, etc. Boost generator 440 can use one or more contextual language models to identify the boosts. In various implementations, the contextual language models can be machine learning models operated by the boost generator 440 or can be systems operated by other language providers such as search engines, wiki or other website operators, mapping systems, etc. These language providers can receive a seed phrase and can identify corresponding boost phrases using machine learning models, phrase matching, or other heuristics (e.g., incoming link counts, user interaction frequencies, quality ratings, etc. parentheses). Additional details on generating boosts based on seed phrases are provided below in relation to block 806 of FIG. 8 and the description of boost generator 440 for FIG. 10.

Intent generator 442 can receive a natural language segment and identify one or more intents, where an intent specifies at least a topic or other semantic identifier, and may also specify relationships between phrases of the natural language segment. In some implementations, parts-of-speech tagger 438 and document understanding model 436 are subcomponents of intent generator 442. In other implementations, intent generator 442 is a separate one or more machine learning models, algorithms, and/or heuristic systems. For example, intent generator 442 can receive a natural language segment which it can map to one or more intent semantic identifiers in an embedding space. In some implementations, a machine learning model or other probabilistic system of the intent generator 442 can adjust probabilities based on boosts identified by boost generator 440. Additional details on generating an intent for a natural language segment are provided below in relation to block 506 of FIG. 5, the descriptions of intent generator 442 for FIGS. 7A and 10, and block 812 of FIG. 8.

Constraint applier 444 can identify and apply (with content item mapper 446) constraints corresponding to the intents generated by intent generator 442. Constraint applier 444 can identify constraints specifying how content items will be selected for the intents and/or how those content items will be incorporated into a storyline. For example, constraints can specify which content items an intent can be mapped to, sources from which to draw content items, configurations or settings to apply to selected content items, story features for which content items should be selected and/or assigned within a storyline, output modalities content items must be compatible with, how select content items are to be incorporated into a storyline, etc. In various implementations, constraint selection can be based on one or more of: the current intent, features from the natural language segment the intent was taken from, and/or previously identified aspects of the story. Additional details on selecting and applying constraints are provided below in relation to blocks 512 through 516 of FIG. 5 and the descriptions for FIG. 7A of constraint applier 444, content item mapper 446, and storyline builder 448.

Context identifier 450 can identify context signals for the natural language segment. Context signals can include, for example, signals associated with the natural language provider, such as location, age, gender, job, education, time, social media friends, etc., and/or signals specifying a context of the natural language interface that provided the natural language segment, such as whether the natural language interface is used by the natural language provider for work or social conversations or previous aspects of the conversation such as phrases used, length, time, connected systems, etc. Context identifier 450 can obtain these context signals from various sources such as from a stored log of the conversation, from parameters associated with the natural language interface, from a social media provider, from a geographical mapping provider, from a search provider, from an employer data store, or any other available resource storing information about the natural language provider, other conversation participants, or the natural language interface. Additional details on obtaining context signals are provided below in relation to block 814 of FIG. 8 blocks 1006 and 1008 and the description of context identifier 450 for FIG. 10.

Content item mapper 446 can augment the conversation based on the intents from intent generator 442. In some cases, for example, selecting content items can be performed using a machine learning model that maps an intent into an embedding space and selects content items with a corresponding embedding within a threshold distance of the intent embedding. In addition or alternatively, content item selection can be based on other mapping algorithms, such as matching phrases or topics of the intents to keywords, categories, identified objects, etc. of the content items. In yet further implementations, content items can be selected using external output providers, connected through output provider interfaces 452 (e.g., APIs, search interfaces, database connections, etc.), which can receive an intent, constraints, and/or context signals, and return one or more content items. In some cases, the output providers are selected based on determining that the output provider matches the current conversation, the intent, and/or the natural language provider. For example, some output providers can be mapped to a work conversation while other output providers are mapped to social conversations. Other such mappings to output providers, for example, can be for categories identified for intent (e.g., recommendations, locations, documents, social network references, etc.), histories of the conversation (e.g. phrases used, content item sources referenced, etc.) or of the natural language provider (e.g., content items previously interacted with, social graph connections, locations visited, etc.), or the natural language interface where the conversation is taking place (e.g., video chat, an artificial reality or other 3D environment, a voice conversation, an instant message conversation), etc.

In some implementations, selecting content items can further be based on one or more constraints from constraint applier 444 and/or context signals from context identifier 450. For example, constraints can specify sources from which content items are to be selected, output modalities a content item must be compatible with to be selected, features of a content item or ways the content item can be modified to be selected, etc. As another example, context signals can be provided to machine learning models, selection algorithms, or output providers to be used as parameters for selecting content items. Additional details on selecting content items based on one or more intents, constraints, and/or context signals are provided below in relation to block 514 of FIG. 5, the description of content item mapper 446 for FIGS. 7A and 10, and block 816 of FIG. 8.

Storyline builder 448 can receive indications of selected content items from content item mapper 446 and incorporate them into a storyline. In some cases, incorporating the content items into the storyline can be based on constraints from constraint applier 444. For example, the constraints can specify how content items relate to each other signifying a placement or interaction in the storyline, can specify a role within the story for a content item (where such roles can have associated rules specifying how the content item is placed within the storyline), can specify how a content item will be modified or animated to be incorporated in the storyline, etc. In some implementations, storyline parameters may be set based on previous intents, and those parameters can partially define how a content item is incorporated. For example, if a previously set storyline parameter for a current scene of the storyline specifies an "eerie" mood, a content item for a scenery role can have its colors darkened accordingly. Additional details on incorporating selected content items into a storyline based on constraints and storyline parameters are provided below in relation to block 516 of FIG. 5, the description of storyline builder 448 for FIG. 7A, and in steps 748, 762, 772, 782, 787, and 796 of FIGS. 7B through 7G.

Conversation integrator 454 can receive identifications of the content items selected by content item mapper 446 and can integrate them into an unstructured conversation. In some implementations, this includes adding a graphical content item to a graphical user interface of a natural language interface in which the conversation is taking place, which can be in a designated location or imposed into the graphical user interface such as with an overlay, interspersed in a textual conversation, moving or resizing other graphical elements to create room, etc. In other cases, adding the content item to the conversation can include playing an audio content item, displaying a 3D model content item in an artificial reality environment (e.g., at a specified location, in a location relative to the natural language provider such as a specified distance away or attached to a hand of the natural language provider or the natural language provider's avatar), or providing haptic feedback content items (e.g., via a glove or other haptic device). Additional details on augmenting an unstructured conversation with selected content items are provided below in relation to block 818 of FIG. 8 and the description of conversation integrator 454 for FIG. 10.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
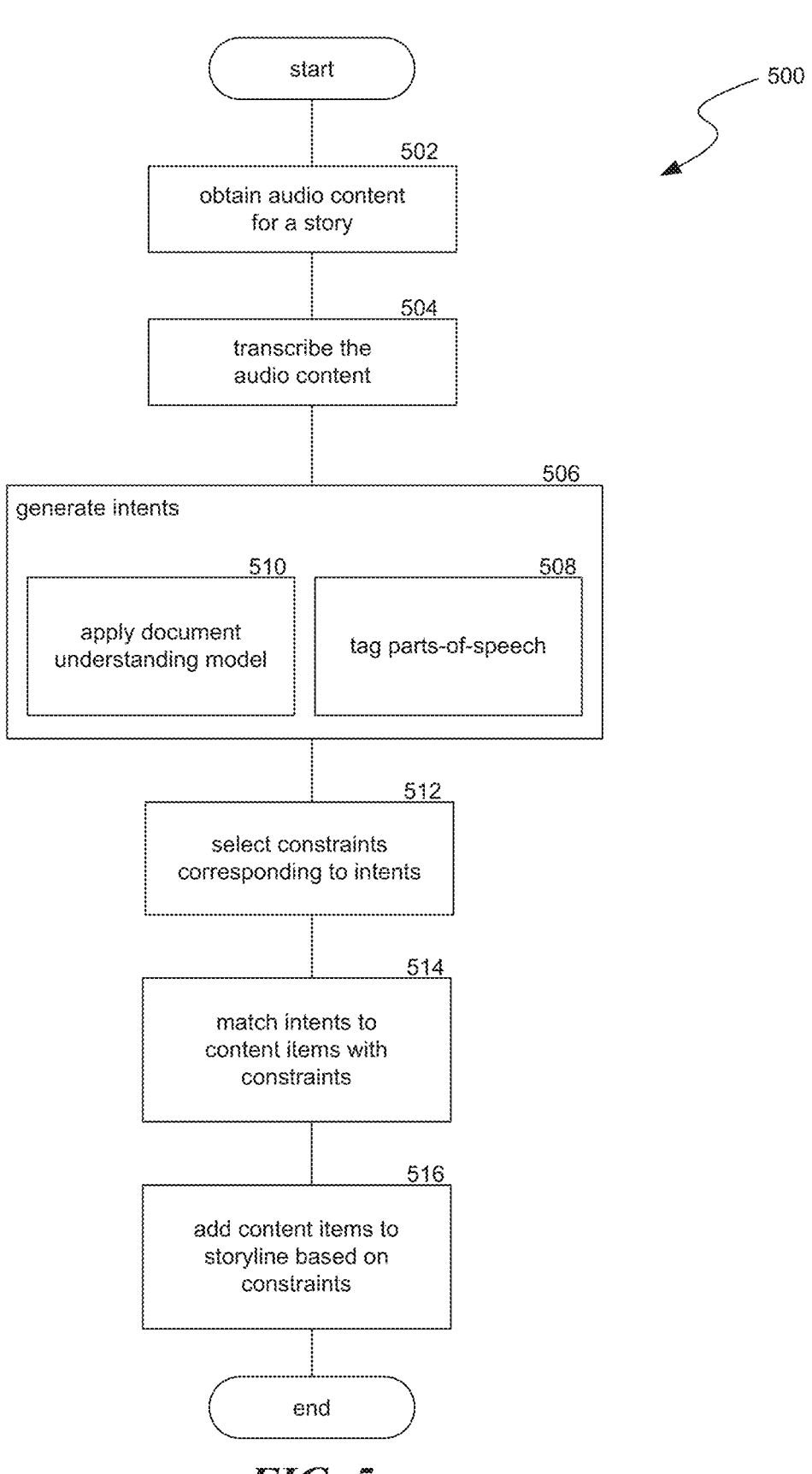
FIG. 5 is a flow diagram illustrating a process used in some implementations of the present technology for creating a storyline of content items based on natural language audio.

FIG. 5 is a flow diagram illustrating a process 500 used in some implementations of the present technology for creating a storyline of content items based on natural language audio. In some implementations, process 500 can be performed in "just in time," e.g., as a response to a user utterance or otherwise receiving a natural language segment. Process 500 can also be performed in "real-time," i.e., process 500 typically provides parts of the storyline within a threshold time of the natural language segment being provided, e.g., one second, three seconds, five seconds, or 20 seconds. In various implementations, process 500 can be performed on a client device (e.g., the device that receives natural language segments from a user or the device that will be presenting the storyline to one or more other users) or on a server device (e.g., a server of a social media or other provider that receives the natural language segments from a client device and uses them to create a storyline).

At block 502, process 500 can receive audio content (natural language segments) from a conversation telling a story. The conversation can be between multiple users recorded by a digital device or between a user and the digital device (e.g., as a dictation). For example, natural language interfaces through which natural language segments can be obtained can be video chat applications, social media platforms, artificial reality systems, telephone or other audio conversation systems, instant message applications, etc. Natural language interfaces can include one or more input modalities (e.g., text, audio, video) and various graphical user interfaces ("GUIs") and/or audio interfaces, e.g., for displaying video, images, or text or playing sound. In various implementations, received audio can be segmented into natural language segments by time segments, according to characteristics of the audio such as pauses or changes in tone, or based on results of the transcription of block 504, e.g. based on sentences.

In some implementations, receiving audio from the user can be in response to a prompt from the system. For example, process 500 can identify that a user is having difficulty telling the story or that a part of the story, of multiple specified story parts, is missing. For example, process 500 can make this identification based on a pause in telling the story that is above a threshold duration, based on particular phrases such as "um" or "ah," or by determining that expected parts of the story (e.g., a main character) have not been specified at a particular point in telling the story. In response, process 500 can provide suggestions (e.g., characters from social media connections, a specified universe, preset defaults, etc.) and/or identify missing parts of the story and prompt the user to fill them in.

At block 504, process 500 can transcribe one or more of the natural language segments, received at block 502, into text. In various implementations, this transcription can be performed using existing transcription libraries or services. In some implementations, the transcription process can be modified to use boosts, as described below in relation to blocks 804 through 810. In some implementations, instead of receiving audio and transcribing it into text, the natural language segments can be received from a user in text, e.g. from a conversation occurring over a messenger application. In these cases, process 500 can begin at block 506 having received the text. In such cases, the natural language segments can be determined according to characteristics of the text, such as the placement of commas and/or periods.

At block 506, process 500 can generate intents for one or more natural language segments obtained through blocks 502 and 504. An intent can be one or more topics, e.g., specified by one or more words, embeddings, or another identifier for semantic meaning. In some implementations, an intent can specify relationships between two or more topics, e.g., how a topic modifies, provides a characteristic of, describes an action for, etc. another topic. Determining an intent can include tagging parts of speech in a natural language segment (at block 508) and applying a document understanding model (at block 510). These steps can be performed in different orders, or iteratively such that output from each can be provided as input to the other until they converge onto stable tagged parts of speech and semantic meanings.

At block 508, a natural language segment can be provided to a parts-of-speech tagging system. Parts-of-speech tagging systems can identify a role of phrases within a natural language segment and how those phrases relate to other phrases in the segment. For example, a parts-of-speech tagger can identify a subject phrase, an object of a subject phrase, actions, adjectives, modifiers, noun phrases, determiners, verb phrases, affections, position phrases, time phrases, quality phrases, quantity phrases, etc. As a more specific example, if the natural language snippet is "A fast car," the phrase "fast" has a modifier relationship with the phrase "car" and the phrase "A" has a "singular article" relationship with the phrase "fast car." Further examples of tags for types of speech are the classifications in the UPenn TreeBank (available at https://www.ling.upenn.edu/courses/Fall 2003/ling001/penn_treebank_pos.html, incorporated herein by reference). In some implementations, the parts-of-speech tagger can use existing libraries or services for parts-of-speech tagging.

At block 510, process 500 can apply a document understanding model to the natural language snippet. A document understanding model can be a machine learning model trained to identify topics in a natural language segment. The document understanding model can be trained on previously identified associations between natural language segments and topics. In some implementations, the document understanding model training items can further provide relationships between natural language segment portions and relationships between natural language segment topics, allowing the trained document understanding model to generate such relationships between the topics for new natural language segments. In some implementations, a document understanding model can embed natural language segments into a semantic meaning space, allowing the model to identify one or more vectors in the semantic space corresponding to the natural language segment. For example, the machine learning model can be trained to map the phrases "female president," "queen," "matriarch," and "empress" to similar areas in the semantic space.

In some implementations, boosts, as discussed below in relation to blocks 804 through 812 of FIG. 8, can be supplied to either or both the parts-of-speech tagger and/or document understanding model to adjust the probabilities used by either model. For example, if the document understanding model received a natural language segment of "Mary took the lift" and normally would (incorrectly) identify "carry" as a topic (based on the word "lift") for the natural language segment, but has a boost of −30% for the phrase "carry," the document understanding model can decrease the likelihood of "carry" being selected, causing the model to instead select a different "elevator" topic for the natural language segment.

At block 512, process 500 can select constraints corresponding to the intents generated at block 506. Constraints can define which content items intents can be mapped to, sources from which to draw content items, configurations or settings for selected content items, story features for which content items should be selected and/or assigned within a storyline, output modalities content items must be compatible with, or how selected content items are to be incorporated into a storyline. In various implementations there can be universal constraints (e.g., constraints all stories conform to), in-story constraints (e.g., common story features that multiple content items can be mapped to throughout the story or that are filled by a single content item per-scene of the story or for the whole story), or can be for just the current intents (e.g., based on a mapping system such as a machine learning model or catalog of phrase mappings that match intents to constraints.) Training data for such a machine learning model can use intents mapped to constraints through human labeling or through labeling based on user interactions with storylines, (e.g., stories that recite a high frequency of social media "likes" can imply that the constraints uses were correctly selected).

In some implementations, constraints can specify a category that a content item must be in or a source from which a content item must be selected. For example, a constraint can specify an existing story "universe" such as a popular movie or television program from which the story author wants to select content items. In some implementations, process 500 can identify these constraints based on selections from the user, parts of the intent, or previous intents.

For example, for a natural language segment "Once upon a time in Neverland," the term "Neverland" can be mapped to a set of content items for "Peter Pan" content items. This constraint can cause the conversation augmentation system to attempt to match future intents (or intents with particular constraints, such as "story setting," or "character") to the Peter Pan data source before attempting to match them to other data sources.

In other implementations, the constraints can specify a characteristic for one or more intent topics. For example, an intent can specify a topic of "fox" with a further color relationship to "green" and the constraint can specify that a selected content item must either already be classified as "green" or can be modified to have that characteristic. In yet further implementations, a constraint can specify a content item configuration setting matching a category of the intent (e.g., specified by an adjective or verb in the natural language segment source of the intent), such as an emotion, an action, a count, or another adjective or verb phrase. In some implementations, the conversation augmentation system can identify these constraints by identifying a specified characteristic (e.g., an adjective or verb) in relation to a subject in the same or another intent.

In some implementations, a constraint can specify one or more established features of a story, such as a character type, a setting/scenery type, an adversary or challenge, etc. For example, for the natural language segment "Jon went to the bank to stop the robbers," the intent "Jon" can have the constraint of the story hero, the intent "bank" can have the constraint of story setting, and the intent "robbers" can have the constraint for a story adversary. In some cases, the constraints can specify that the intent corresponds to a mood or atmosphere selection for the story or current scene, e.g., dark, foreboding, jolly, sinister, etc. In some implementations, the conversation augmentation system can identify these constraints based on when they are introduced (e.g., the hero and setting are typically introduced in the first few natural language segments of the story), a type of the intent (e.g., intents determined to be locations are likely to be settings, intents that specify objects below a certain size are likely to be props in a scene), words implying moods can be mapped to particular character types (e.g., terrible is likely to be associated with the adversary in a story while courageous is likely to be applied to the hero of a story). Such categorizations can be based on a mapping to these categorizations for intents or phrases that are determined to be synonyms to the intent.

In some instances, a constraint can specify a modality of the content item, such as a sound, a video, a picture, etc. In some implementations, process 500 can identify these constraints by determining that the intent falls within a specified category of content items, (e.g., some word such as "roar," "clunk," or "pop," can be classified as including a sound effect) or based on other words associated with the intent (e.g., where the natural language segment uses sound modifiers in association with the intent such as "deafening" in the phrase "the roar was deafening.")

In some implementations, a constraint can specify personal indicators of the natural language provider, e.g., my mom or my friend Sara, signifying that a selected content item should be selected from sources associated with the natural language provider. In some implementations, the conversation augmentation system can identify these constraints based on personal indicator words in the intent, e.g., my, I, we, etc., words that typically specify a relationship e.g., mom, brother, friend, etc., or by comparing words in the intent to social media connections in the social graph of the natural language provider, e.g., the intent is "David Johnson" and the natural language provider has a friend on a social media site with that name.

At block 514, process 500 can match the intents from block 506 to one or more content items, based on the constraints selected at block 512. In some implementations, this matching can be done by a machine learning model that receives intents (e.g., topics and/or relationships) and outputs either an identification of one or more content items or selection criteria for content items (e.g., keywords, object identifiers, etc.) The machine learning model can be trained to perform this matching using training items of intents mapped to content items or content item classifications. This training data can be generated based on human tagging of content items for intents, by pulling content items used to illustrate existing spoken stories, or by extracting correspondences between illustrated stories (e.g., movies, television, etc.) and intents, such as by identifying intents in dialogue for movies or the text of books that are made into movies and matching the intents to content items from the movie.

In some implementations, content items can be classified using a first machine learning model and the machine learning model at block 514 can be trained to select corresponding classifications for selecting content items. In this way, the machine learning model can select from a large set of content items, without having to be aware of each individual content item.

In some implementations, the machine learning model can also take one or more constraints from block 512 as input. For example, the set of constraints can be passed as a group to the machine learning model or selected constraints having different categories (e.g., content item topics, content item sources, content item characteristics, etc.) can be included in a sparse constraint vector in positions corresponding to the constraint type.

In other implementations, constraints can be applied separately from the machine learning model, e.g., to limit the set of possible content items from which the machine learning model can select. For example, to select content items in some cases, the machine learning model can map the intent into an embedding space for content items and then process 500 can select one or more content items or classifications that have embeddings closest to the embedding for the intent and/or that are within a threshold distance. In some implementations, the mapping can use other or additional techniques such as category matching (e.g., selecting content items with metadata, such as category tags and/or relationships, that match the one or more intents). Such metadata can be applied to content items using machine learning techniques (e.g., object identification, keyword identifiers, emotion or mood identifiers, etc.) and/or can be supplied by human tagging of content items.

Constraints can also operate on content item metadata (e.g., characteristic tags, action tags, object tags, emotion tags, etc.) to limit the content items that can match intent topics. In some implementations, where one or more constraints specify a source for the content item (e.g., from a set of photos associated with the natural language provider, from a content item store in a particular genre, or from content items associated with a particular existing universe) or an output modality, the matching can be limited to content items from that source, can prioritize content items from that source, or can be limited to content items that can be output in the specified modality. For example, where a constraint specifies a personal indicator (e.g., "Uncle Thomas,") the content item selection can be limited to content items associated with the natural language provider, or even that are associated with the specified personal relationship (e.g., only select pictures from a social medial site where the images are associated with an entity with a "uncle" relationship on the social graph). As another example, where the constraint specifies an output modality of sound, an intent of "lion" can be matched to a sound file depicting a lion roaring. As yet another example, where the constraint specifies the Peter Pan universe, process 500 can first attempt to match the intent to content items from content items of that universe before attempting to find other matching content items.

In some cases, where one or more constraints specify a content item characteristic in a category (e.g., green in the color category, happy in the emotion category, etc.) process 500 can limit content item selection to content items that ether specify the content item characteristic or that can be modified in the category of the content item characteristic. For example, where a natural language segment is "the anxious parrot went to Cuba," an intent can be determined as "parrot" with a corresponding constraint of "nervous" which is determined to be in the category of "emotional state" based on a mapping of content item characteristic constraints to categories. The constraint can limit the content item selection to content items that are either tagged with a "nervous" indicator or that can have a modifiable emotional state property. Process 500 can select a picture of a parrot that has particular replaceable features to make the parrot appear in different emotional states, and can cause the features for "nervous" to be applied to the parrot picture. Similarly, where the constraint specifies a feature of a story (such as character type, a setting/scenery type, whether adversary or challenge) process 500 can limit content item selection to content items that have been identified as fitting within that story feature. Similarly, for constraints that specify mood or atmosphere, content items can be selected that have an identifier matching the specified mood or atmosphere or that can be modified to match it.

At block 516, process 500 can add the content item(s) selected at block 514 to a storyline. In some cases, adding the content items to the storyline can be based on one or more constraints. Content items can be added to a storyline on a scene by scene basis, where scenes can be defined by the selected constraints. For example, a first scene can have a setting that has been filled based on a natural language segment. When the natural language provider provides another natural language segment that generates an intent that is mapped to a new setting, this can cause process 500 to create a new scene. Similarly, scenes can be based on certain interactions between identified scene participants. For example, an intent matching both a hero and a villain can be added to the storyline in the villain role if the hero role has already been filled.

In some implementations, constraints can specify how content items should be modified or duplicated before being added to the storyline. As examples, a content item can be adjusted to be larger than other content items in the scene based on a constraint specifying that the content item is "huge," a character content item can be modified to have tears or be frowning based on a constraint specifying that the character is "sad," or multiple copies of a content item can be added to a scene based on a constraint specifying that there are "four" of the content item.

Selected and/or modified content items can be added to the storyline to fill certain roles or story parameters available in the story or the current scene, such as hero, adversary, setting, supporting character, prop, etc. In some cases, one type of story parameter can have multiple instances, e.g., there can be multiple supporting characters, which can be instantiated each time a new intent with a supporting character constraint is identified. In other cases, certain types of story parameters can have only one instance or only one instance for a particular scene, such as a setting parameter or an atmosphere parameter. Story parameters can specify how content items for that parameter are added to a scene. For example, content items for a setting can be added to the background, content items for the story hero or adversary can be made central to a scene, props can be considered dependent on another role and placed in relation to that other content item, etc.

Content items can also be added to a scene in relation to other content items previously added to the scene. For example, the intents can specify relationships between topics in the intent or between intents, and this relationship can be maintained in the scene. As a more specific example, intents can specify "an apple," "a tree" and that the apple "fell from" the tree. The scene can include content items for the apple and the tree and, based on the identified relationship of "fell from," can show the apple below the tree. In some implementations, based on such determined relationships between content items or actions specified for content items, process 500 can animate the content items added to a scene. For example, the apple in the previous example can be animated to be falling from the tree.

As a natural language provider continues to provide natural language segments for the story, process 500 can repeat, adding more content items to the storyline. As content items are selected for the storyline, they can fill in storyline parameters, based on the constraints that the content items correspond to. For example, the storyline can specify story parameters such as a setting, one or more main characters, one or more obstacles or adversaries, supporting characters, props, music/sound effects, mood or atmosphere, etc. Multiple storyline templates can be defined such that the storyline with parameters best matching the intents provided so far can be used. Storyline parameters can be constant throughout the story or can be set on a scene by scene basis. Some parameters can be fixed once set while others can be updated based on additional natural language segments.

In some implementations, as a natural language provider provides new natural language segments, the intents determined for the new natural language segments can be based on the previous natural language segments. For example, if a first natural language segment is "Chantel shared her toy" and a subsequent natural language segment is "she took it back," process 500 can determine that "she" refers back to a previously determined intent "Chantel" and "it" refers back to the previously determined intent "toy." In some implementations, these subsequent determinations can be accomplished using relationships identified in intents and/or corresponding constraints.

In some cases, process 500 can also receive identifications of user gestures, e.g., from an artificial reality device. Process 500 can use these gestures as a further input for selecting, modifying, placing, or animating content items. For example, where a natural language provider waves her arms in relation to a "bird" content item, process 500 can transpose this action onto the bird, causing it to be animated as flapping its wings.

When a natural language provider creates a storyline, in some cases that storyline can be saved, posted to social media, cast to various devices, transmitted over a network connection (e.g., as an augmentation to a video chat), etc. In some implementations, a shared storyline can be configured to allow others to view the story, to continue the story from where the first natural language provider left off, or to modify part of the story created by the first natural language provider. For example, the storyline can be shared via a social media platform, where it is accessed by another user who can extend the storyline through further automatic generation of content items from further audio content or can modify existing parts of the storyline.

FIG. 6 is a conceptual diagram illustrating an example 600 of real-time generation of a storyline of content items based on natural language audio. Example 600 includes a natural language provider 602 telling a story 612 through audio that is recorded by computing device 606. The story 612 provided by the natural language provider 602 includes multiple natural language segments 614A-614H. As each natural language segment 614 is provided, process 500 (FIG. 5) is performed for that natural language segment by computing system 606, computing system 608, or by a server system in cloud 610. Additional details on the example storyline generation for story 612 are provided below in FIGS. 7A-7G. The storyline created by process 500 is provided on a natural language interface on computing system 608 for viewers 604A and 604B.

Figure 7A:
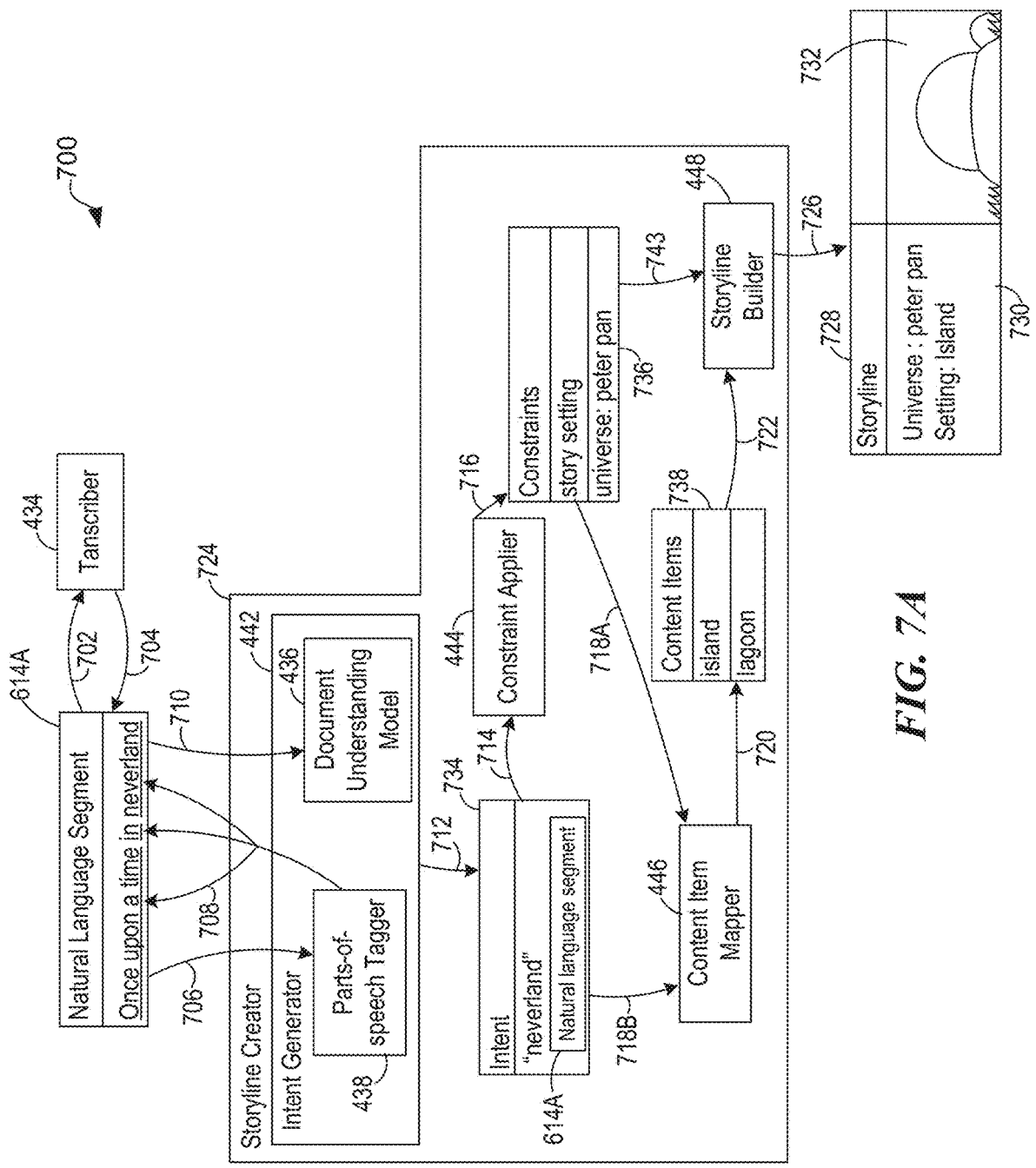
FIGS. 7A-7G are conceptual diagrams illustrating the storyline of content items automatically generated in real-time from the example shown in FIG. 6.

FIGS. 7A-7G are conceptual diagrams of examples 700, 740, 750, 765, 775, 783, and 788, illustrating the real-time generation of the storyline of content items from example 600 shown in FIG. 6. FIG. 7A, for example, includes modules to create a storyline 728 for natural language segments such as natural language segment 614A from example 600. These modules include the transcriber 434 and a storyline creator 724. The storyline creator 724 comprises further sub-modules including the intent generator 442, which has the parts-of-speech tagger 438 and the document understanding model 436, the constraint applier 444, the content item mapper 446, and the storyline builder 448.

Example 700 begins when a first natural language segment 614A is provided for the story 612. In this example, the natural language segment 614A is recorded from spoken words, and this segment is provided in response to a pause by the natural language provider. Example 700 starts processing the natural language segment 614A by providing it to transcriber 434 at step 702. Transcriber 434 converts the audio of natural language segment 614A into text "Once upon a time in Neverland" and returns the text at step 704. Additional details on transcribing and natural language segment are provided above in relation to module 434 of FIG. 4 and block 504 of FIG. 5.

At step 706, example 700 provides the natural language segment 614A to storyline creator 724 which passes it to parts-of-speech tagger 438 of intent generator 442. Parts-of-speech tagger 438, at step 708 provides parts of speech identifications for "Once upon a time" as an introductory phrase, for "Neverland" as a subject, and for "in" as a transitional verb phrase. Intent generator 442, at step 710, provides the textual version of natural language segment 614A, including the parts-of-speech tags, to the document understanding models 436. The document understanding model 436 identifies intents 734, which are output by intent generator 442 at step 712. In example 700, the intent 734 identifies "Neverland." Intent 734 is also paired with the textual version of natural language segment 614A. Additional details on generating an intent are provided above in relation to modules 438, 436, and 442 of FIG. 4 and block 506 of FIG. 5.

At step 714, storyline creator 724 provides intent 734 to constraint applier 444. Constraint applier 444 determines that "Neverland" is a place that is in conjunction with an introductory phrase, and, based on this determination, iden- tifies a story setting constraint for the intent 734. Constraint applier 444 further performs a search for "Neverland" and identifies that the phrase "Neverland" is on a list of universes from which content items can be selected, thus constraint applier 444 selects the corresponding universe "Peter Pan" as a content item source universe for the current story. At step 716, example 700 returns these constraints 736. Additional details on selecting constraints are provided above in relation to module 444 of FIG. 4 and block 512 of FIG. 5.

At steps 718A and 718B, storyline creator 724 provides intent 734 and constraints 736 to content item mapper 446. Content item mapper 446 selects content items based on the intent 734 and constraints 736. In example 700, this occurs by selecting content items, from a content item store for the Peter Pan universe, that match the "Neverland" intent. Content item mapper 446 does this matching by applying a machine learning model that receives the "Neverland" intent and maps it into a vector space which content items of the Peter Pan universe have also been mapped. Using a cosine distance comparison, content item mapper determines that there are two Peter Pan content items within a threshold distance of the "Neverland" intent: a content item for an island and a content item for a lagoon. Content item mapper 446 provide identifications 738 of these content items at step 720. Additional details on selecting content items with constraints are provided above in relation to module 446 of FIG. 4 and block 514 of FIG. 5.

The identifications 738 for the content items are provided to storyline builder 448 at step 722. Storyline creator 724 also provides, at step 743, the constraints 736 to the storyline builder 448. Storyline builder 448 obtains the content items identified by identifications 738 and, based on the constraints 736, creates a first scene of a storyline 728, which it provides at step 726. Storyline 728 includes storyline parameters 730 and output 732. In example 700, storyline builder 448 has set a universe parameter of the storyline to Peter Pan based on the universe constraint and has set a current setting of the storyline as an island with a lagoon based on the setting constraint of the constraints 736 and the content items 738. Storyline builder 448 has also included the content items 738 in the output 732 as setting content items, showing an island with a lagoon. Additional details on creating a storyline using selected content items and constraints are provided above in relation to module 448 of FIG. 4 and block 514 of FIG. 5.

Figure 7B:
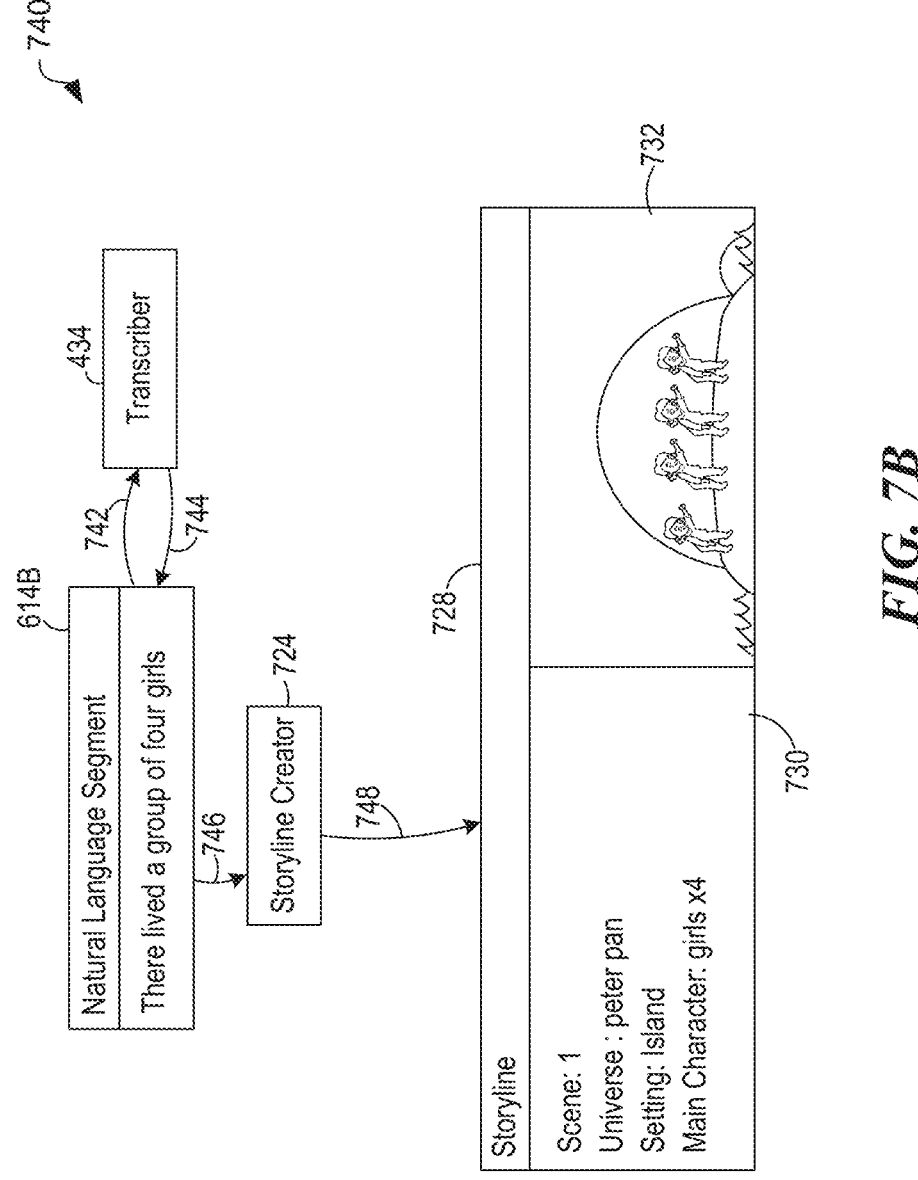

FIG. 7B includes the transcriber 434 and the storyline creator 724 modules to create further parts of storyline 728, based on natural language segment 614B from example 600. In FIGS. 7B-7G, the storyline creator 724 includes further sub-modules as discussed above in relation to FIG. 7A. However, the operation of these sub-modules in FIGS. 7B-7G operate in a similar manner as discussed above, and thus are not described further.

Example 740 begins with receipt of natural language segment 614B which, at step 742, is provided to transcriber 434. Transcriber 434 provides a textual version "there lived a group of four girls" of natural language segment 614B at step 744. At step 746, example 740 provides the textual version of the natural language segment 614B to the storyline creator 724. In example 740, storyline creator 724 creates, at step 748, the further part of storyline 728 by identifying an intent of "girls" and constraints for this intent of main characters and multiplier times four. Storyline creator 724 maps these intent and constraints to an illustration of a girl, and places of them in the storyline output 732 in relation to the previously established island setting.

Storyline creator 724 also designates the illustrations of the four girls as filling a main character role in the story parameters 730.

Figure 7C:
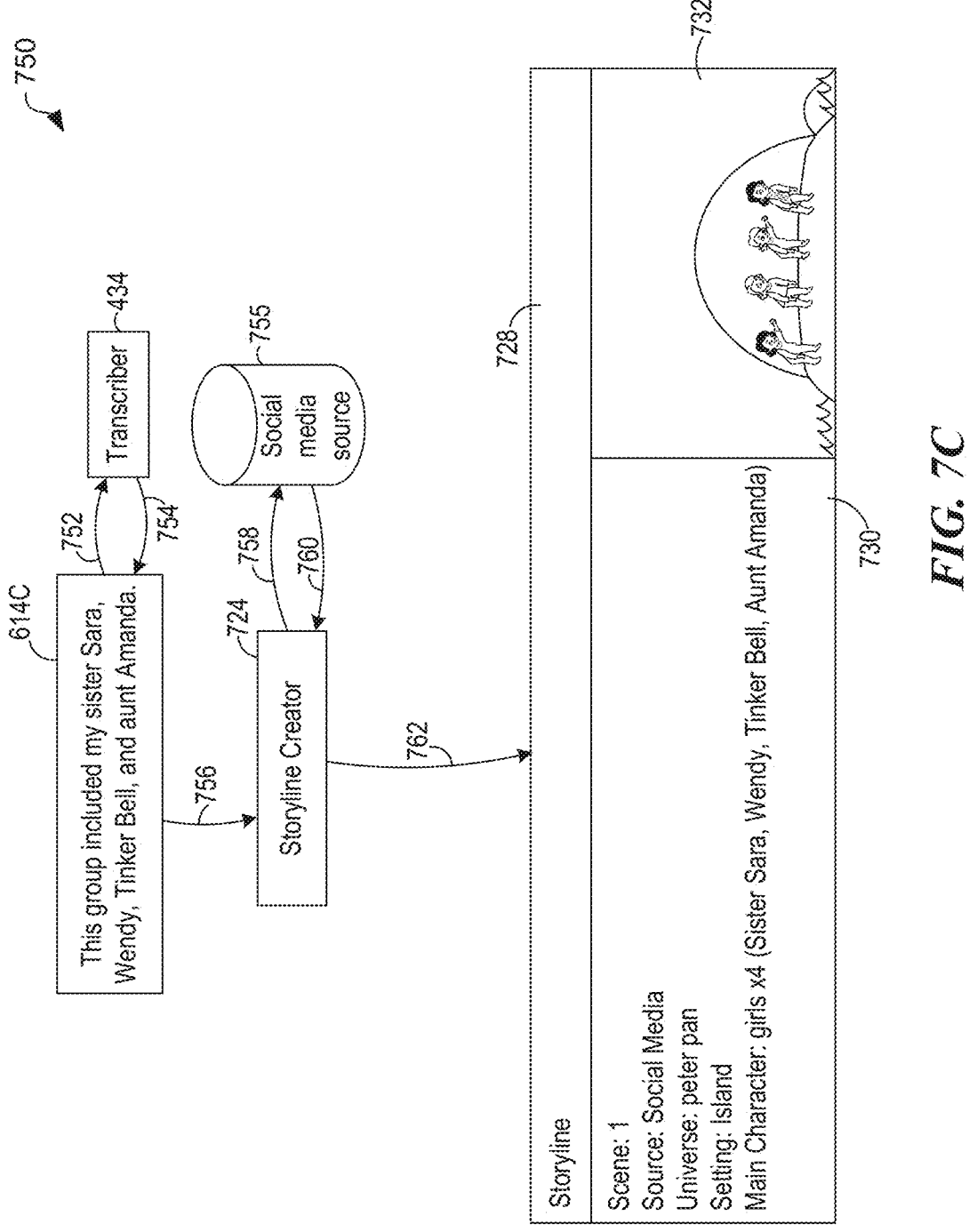

FIG. 7C includes the transcriber 434 and the storyline creator 724 modules to create further parts of storyline 728 based on natural language segment 614C from example 600. Example 750 begins with receipt of natural language segment 614C which, at step 752, is provided to transcriber 434. Transcriber 434 provides a textual version "This group included my sister Sara, Wendy, Tinker Bell, and Aunt Amanda" of natural language segment 614C at step 754. At step 756, example 750 provides the textual version of the natural language segment 614C to the storyline creator 724. In example 750, storyline creator 724 creates, at step 762, the further part of storyline 728 by identifying intents of "sister Sara," "Wendy," "Tinker Bell," and "Aunt Amanda." Storyline creator 724 identifies personal indicators for the intents "sister Sara" and "Aunt Amanda" by identifying the "sister" and "aunt" modifiers as personal indicators, causing the storyline creator 724 to associate a source constraint of a social media provider for these two intents. A machine learning model of the storyline creator 724 also identifies a relationship between the previously identified "group of girls" and the new intents based on the "this . . . included" phrase.

The social media constraint and the previously identified constraint for the Peter Pan universe provide different sources from which to draw content items. In example 750, constraint types have a pre-established hierarchy in which the "social media source" constraint has a higher priority than the universe constraint. For example, this is a determination that a natural language provider is more likely to want to draw content from her personal social media content items than from a specified universe, but if no content item in the social media source matches the specified intent, then the system next searches for a match in the content items from the specified universe, followed by searching general content items. The storyline creator 724 at step 758, connects to the social media source 755 and selects content items, based on a social graph associated with the natural language provider, of pictures of the natural language provider's sister whose name is Sara and aunt whose name is Amanda. The storyline creator 724 also selects illustrations of a character named Wendy and a character named Tinker Bell, for the corresponding intents, from the content items in the Peter Pan universe.

Based on the identified relationship between the previously identified "group of girls" and the new intents, the storyline creator places the four selected content items in the storyline output 732 as replacements for the previously selected four illustrations of a girl and updates the designations of the main character role in the story parameters 730 to indicate these illustrations.

Figure 7D:
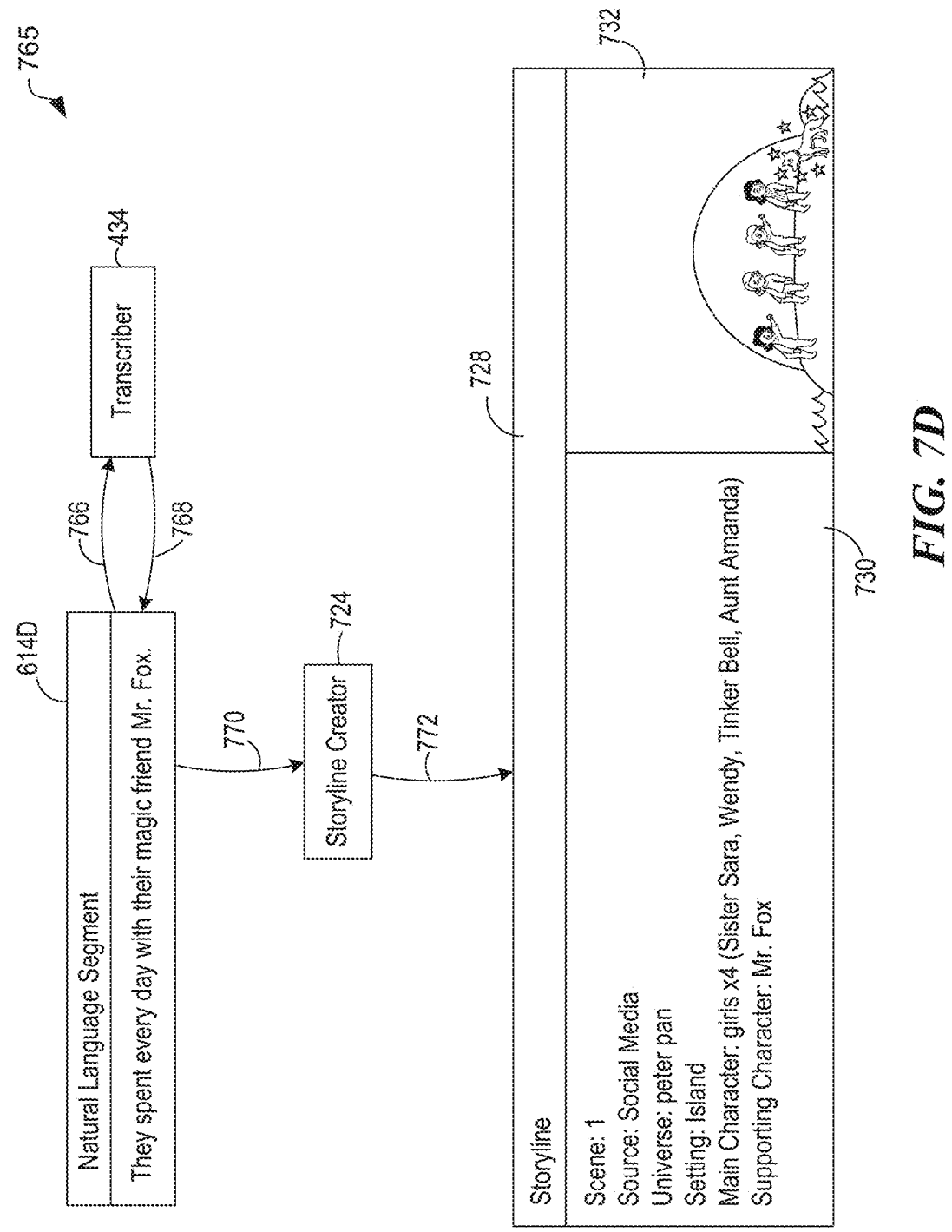

FIG. 7D includes the transcriber 434 and the storyline creator 724 modules to create further parts of storyline 728 based on natural language segment 614D from example 600. Example 765 begins with receipt of natural language segment 614D which, at step 766, is provided to transcriber 434. Transcriber 434 provides a textual version "They spent every day with their magical friend Mr. Fox" of natural language segment 614D at step 768. At step 770, example 765 provides the textual version of the natural language segment 614D to the storyline creator 724. In example 765, storyline creator 724 creates, at step 772, the further part of storyline 728 by identifying intents of "magical" and "fox" with an identified relationship of magic-modifying fox, and a constraint for the "fox" intent of supporting character due to the relationship between this intent and a reference to the main characters. Storyline creator 724 maps these intents and constraint to an illustration of a fox and an illustration of magical stars from a general content item repository as it was unable to find one in the Peter Pan universe content item repository. Storyline creator 724 places these content items in the storyline output 732 in relation to the previously established island setting and the previously added four girls main characters. Also, due to the relationship of modifies between "magical" and "fox," storyline creator 724 places the magic stars content item around the fox content item. Storyline creator 724 also designates the illustration of the fox as filling a supporting character role in the story parameters 730.

Figure 7E:
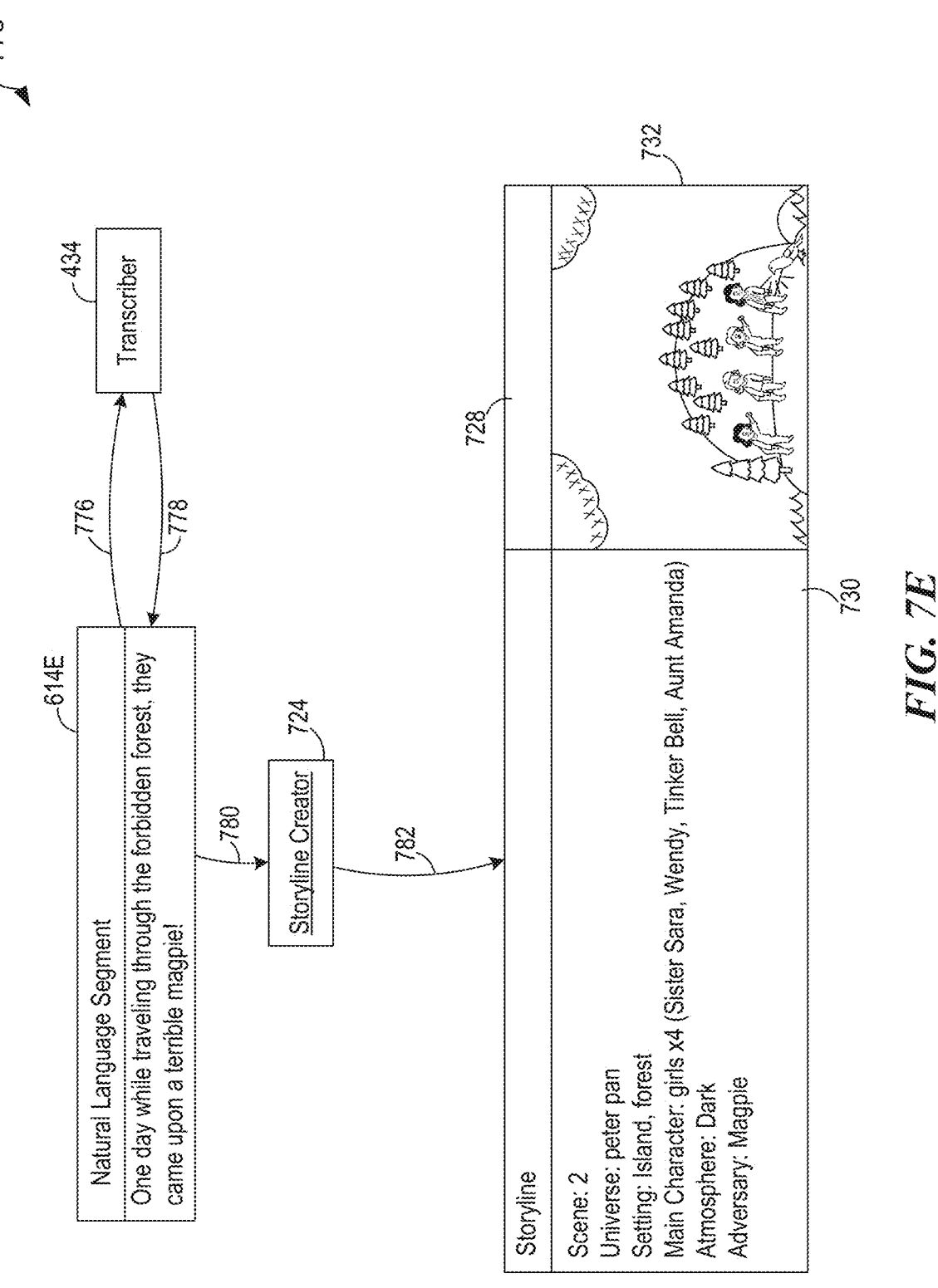

FIG. 7E includes the transcriber 434 and the storyline creator 724 modules to create further parts of storyline 728 based on natural language segment 614E from example 600. Example 775 begins with receipt of natural language segment 614E which, at step 776, is provided to transcriber 434. Transcriber 434 provides a textual version "One day, while traveling through the forbidden forest, they came upon a terrible magpie" of natural language segment 614E at step 778. At step 780, example 775 provides the textual version of the natural language segment 614E to the storyline creator 724. In example 775, storyline creator 724 creates, at step 782, the further part of storyline 728 by identifying intents of "forest" with a constraint of "mood: dark" based on the associated "forbidden" intent and an intent of "magpie" with a "story role: adversary" constraint based on the associated "terrible" modifier. Storyline creator 724 maps these intents and constraints to 1) an illustration of a forest that can be added as scenery and illustrations clouds that can be modified to match the specified "dark" mood and 2) an illustration of a magpie, modified with surrounding lines expressing observing the magpie would be "terrible." The storyline creator 724 places the forest and clouds as secondary settings in the story, added to the island setting and places the magpie in a location in relation to settings and in relation to the main character content items, as dictated by the "adversary" constraint. Storyline creator 724 also designates, in the story parameters 730, the illustrations of the forest and clouds as additional settings, designates a mood for the current scene as dark, and designates the illustrations of the magpie as an adversary.

Figure 7F:
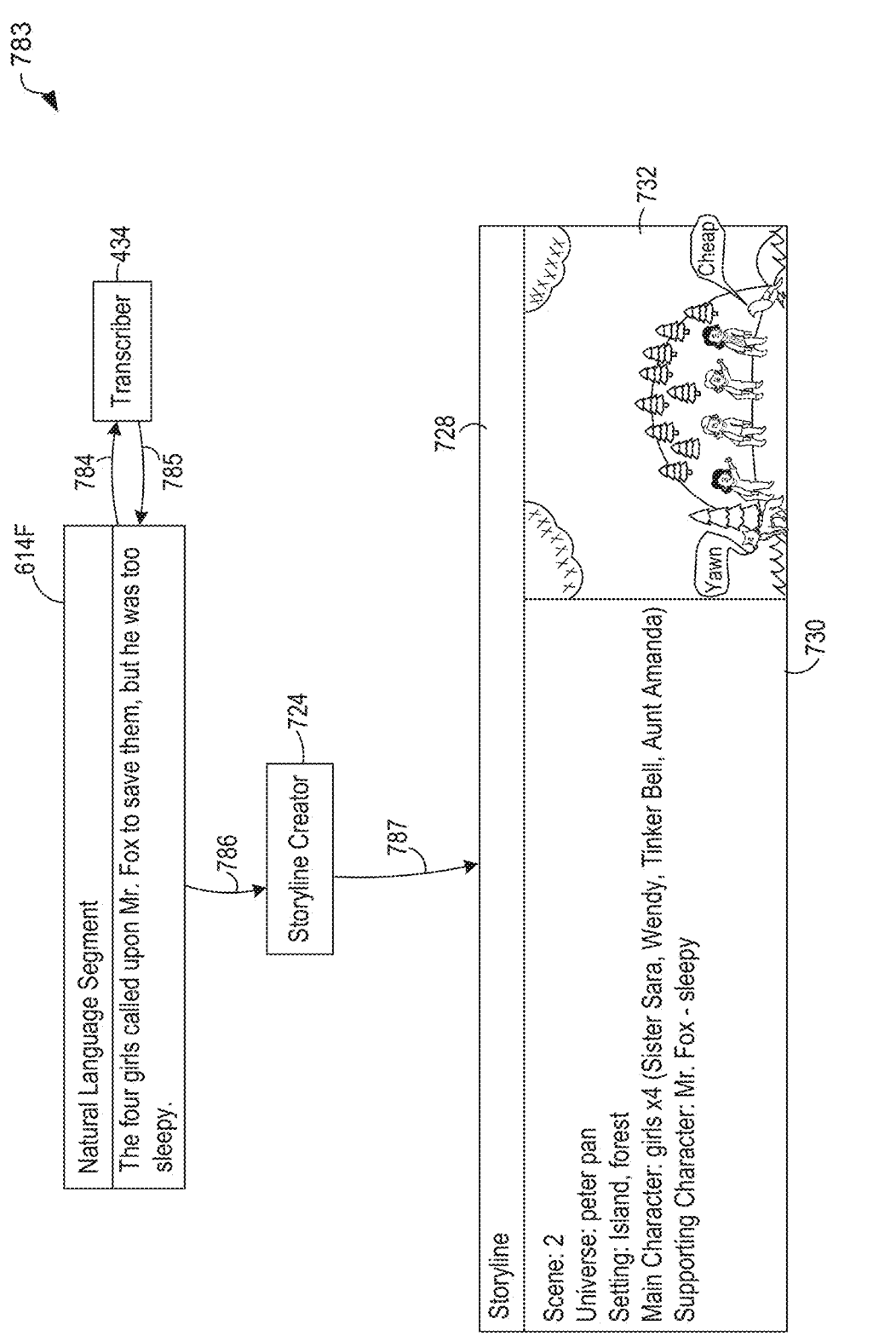

FIG. 7F includes the transcriber 434 and the storyline creator 724 modules to create further parts of storyline 728 based on natural language segment 614F from example 600. Example 783 begins with receipt of natural language segment 614F which, at step 784, is provided to transcriber 434. Transcriber 434 provides a textual version "The four girls called upon Mr. Fox to save them, but he was too sleepy" of natural language segment 614F at step 785. At step 786, example 783 provides the textual version of the natural language segment 614F to the storyline creator 724. In example 783, storyline creator 724 creates, at step 787, the further part of storyline 728 by identifying intents of "four girls," "called," "fox," and "sleepy," with identified relationships of "modifies" between "fox" and "sleepy" and "acts upon" between "four girls" and "fox." Storyline creator 724 determines that the "four girls" and "fox" intents correspond to previous content items added to the storyline and thus confirms that the content items for the four girls are already in the current scene and adds the "fox" content items from the previous scene to the current scene. The story creator 724 also identifies a "yawn" sound effect corresponding to the "sleepy" intent and a "calling" modification to content items depicting characters for the "called" intent.

The story creator 724 adds the yawn sound effect to the fox content item due to the identified relationship between their corresponding intents and modifies some of the "four girls" content items to implement the "calling" modification (raising their arms) due to the identified relationship between their corresponding intents. Further, the story creator 724 further adds an additional effect to another content item in the scene to add depth to the story-adding a "cheep" sound effect associated with the bird category of the magpie content item. Storyline creator 724 also associates, in the story parameters 730, the fox content item, which still has the supporting character role, with a sleepy modifier.

Figure 7G:
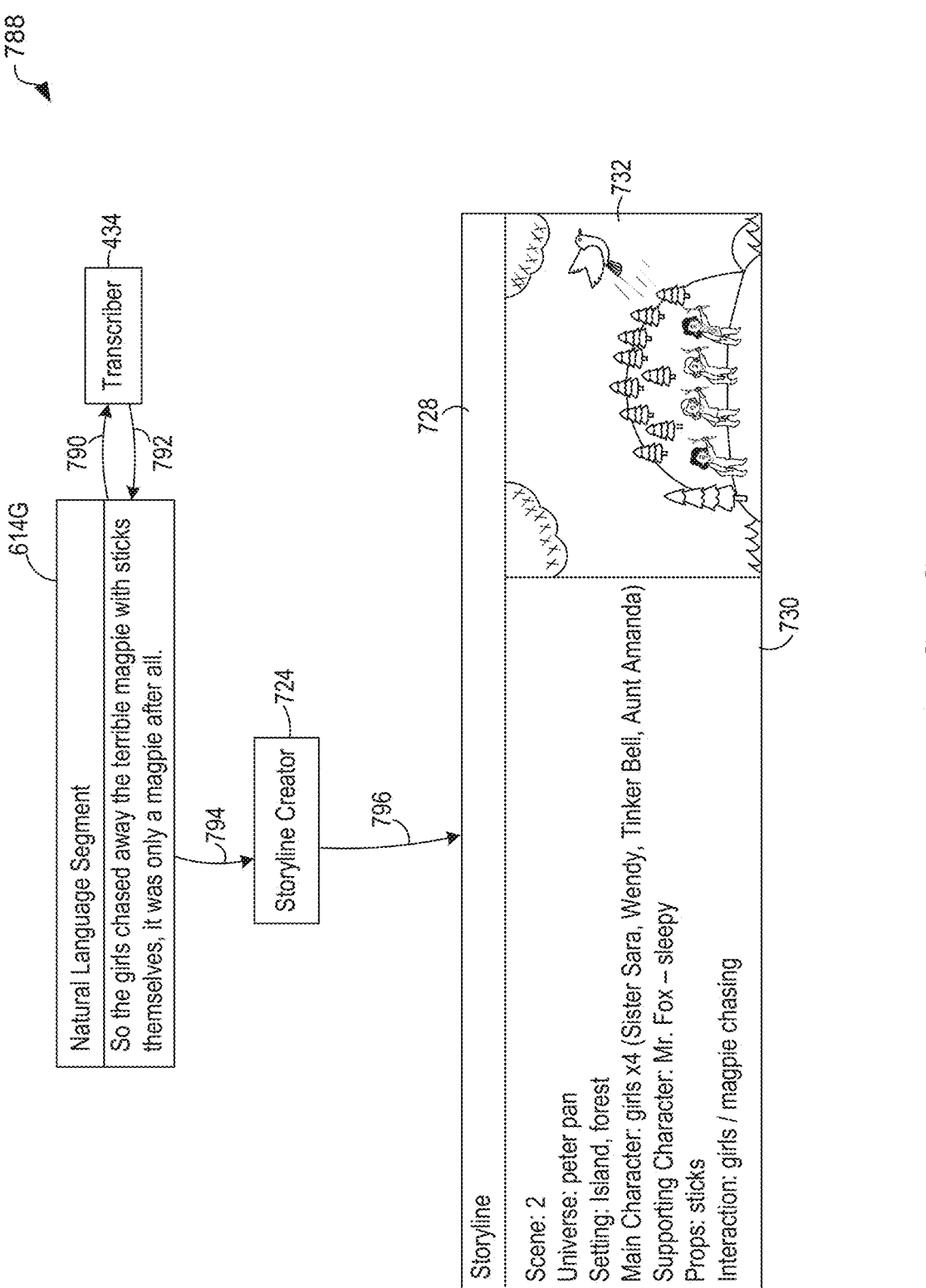

FIG. 7G includes the transcriber 434 and the storyline creator 724 modules to create further parts of storyline 728 based on natural language segment 614G from example 600. Example 788 begins with receipt of natural language segment 614G which, at step 790, is provided to transcriber 434. Transcriber 434 provides a textual version "So the girls chased away the terrible magpie with sticks themselves; it was only a magpie, after all" of natural language segment 614G at step 792. At step 794, example 788 provides the textual version of the natural language segment 614G to the storyline creator 724. In example 788, storyline creator 724 creates, at step 796, the further part of storyline 728 by identifying intents of 1) "chasing" with a relationship between "the four girls" and the "magpie" content items, 2) a "sticks" intent with and a relationship to the four girls and a "prop" constraint. Storyline creator 724 determines the "chasing" intent specifies an action between existing content items and thus does not map a new content item for it but maps the "sticks" intent to a content item labeled, by an object identification model, with a "stick" content item. Storyline creator 724, based on the determined relationship between the girls and the sticks intents and because the sticks are specified as a prop by the constraint, places the sticks content items in the hands of the girls. Storyline creator 724 further, based on the determined relationship between the "chase" intent in relation to the girls and magpie intents, specifies and animation for the magpie content item to be animated to leave the current scene, which is accomplished through an animation specified for bird content items adding a flying animation to the magpie as it is moved out of the scene. Storyline creator 724 can then add an ending scene (not shown) that is mapped to an intent for the natural language segment 614H ("The End"), completing the storyline.

Figure 8:
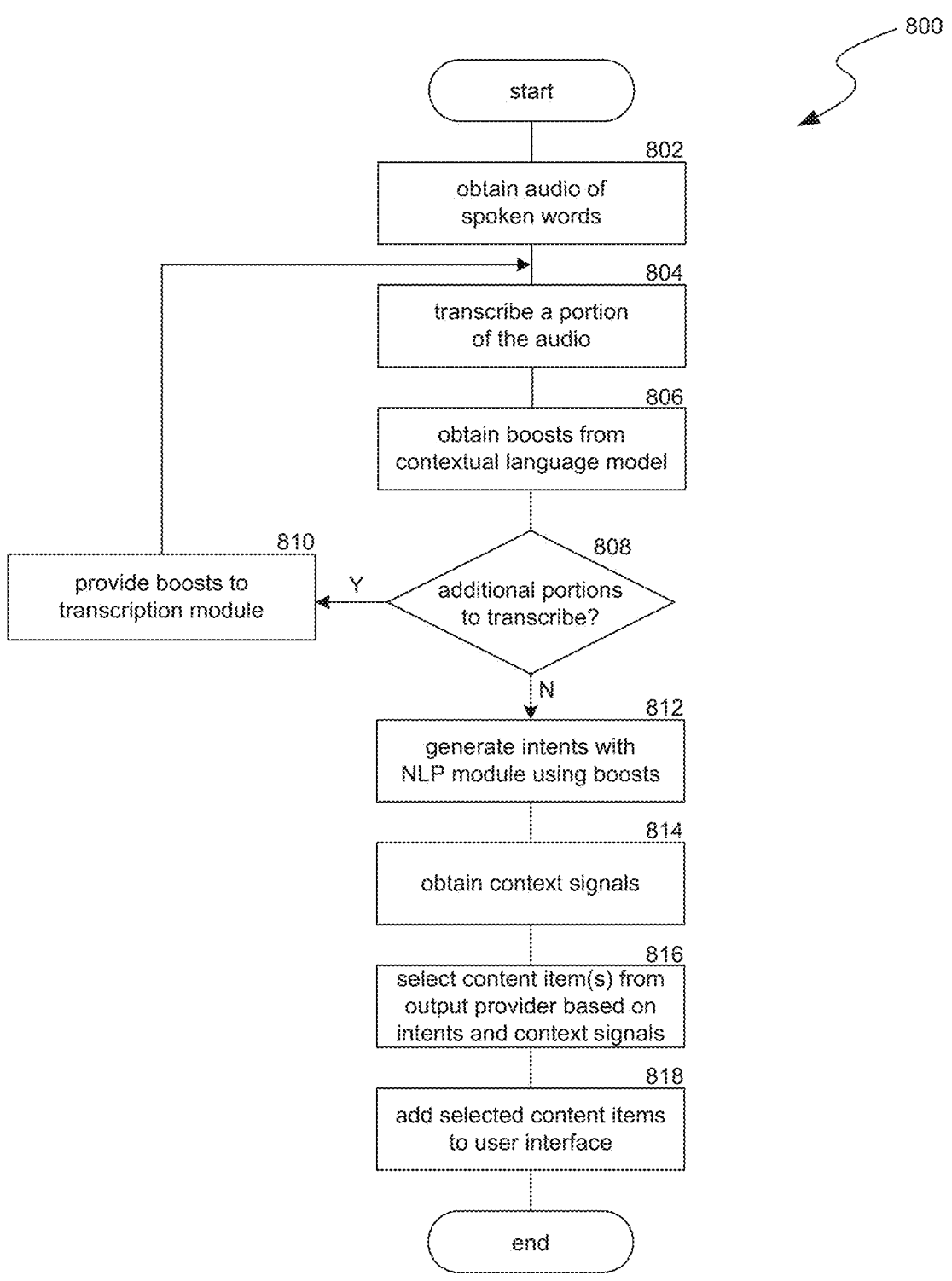
FIG. 8 is a flow diagram illustrating a process used in some implementations of the present technology for augmenting an unstructured conversation with content items based on conversation natural language.

FIG. 8 is a flow diagram illustrating a process 800 used in some implementations of the present technology for augmenting an unstructured conversation with content items based on conversation natural language. In some implementations, process 800 can be performed "just in time," e.g., as a response to a user utterance or otherwise receiving a natural language segment from an unstructured conversation. Process 800 can also be performed in "real-time," i.e., content items are typically provided within a threshold time of the natural language segment being provided, e.g., one second, three seconds, five seconds, or 20 seconds. In various implementations, process 800 can be performed on a client device (e.g., the device that receives natural language segment from a user or the device that will be presenting the natural language interface with the augmented content item to one or more other users) or on a server device (e.g., a server of a video chat, social media, or other provider that receives the natural language segments from a client device and uses them to identify one or more corresponding content items).

At block 802, process 800 can obtain a natural language segment provided by a natural language provider to a natural language interface, e.g., as audio of spoken words from a conversation over video, an artificial reality environment, or phone call. In other implementations, the natural language segment can be obtained as text entered into an instant message, email, social media post or other written conversation, etc. In various implementations, the conversation can be a multi-party conversation between users in the same or different geographical locations or a user speaking to a computing device. Where the natural language segment is provided as text, blocks 804, 808, and 810, and are skipped by process 800.

At block 804, process 800 can transcribe some or all of the audio received at block 802. As blocks 804-810 form a loop, in some cases, block 804 can also receive one or more "boosts" from block 810 and the transcription at block 804 can be based on some of these boosts. A boost is a phrase or topic for which the probably of being selected by a machine learning model (e.g., as a translation of audio input or as an intent matching textual input) is modified. As discussed below in relation to block 806, boosts can be selected by a contextual language model based on seed phrases. In various implementations, parts of the transcription can be identified as seed phrases based on one or more of: identifications of phrase transcription confidence values being above a threshold; transcribed phrases identified as having certain types (e.g., the subject of a sentence, place names, high-confidence proper nouns, etc.); frequency of use (e.g., phrases that are more often used or used above a threshold amount are selected as a seed); or identifications of phrase categories known to have low transcription quality rates (e.g., nouns associated with difficult to transcribe phrases such as proper nouns, colloquial phrases, slang, etc.). In some cases, seed phrases can be selected based on certain associations or grammatical relationships between phrases. For example, a first noun that is an action target of a second noun that has a low confidence translation can be selected for identifying boost phrases. As a more specific example with a natural language segment of "Sephron went to Cornell," where Sephron is a low confidence transcription, the subject noun of the action "went to" is Cornell, which has a higher confidence transcription, this can be the basis for selecting "Cornell" as a seed phrase, which may yield boosts that will improve the transcription confidence of "Sephron."

In some implementations, one or more seed phrases can be selected from sources other than a current natural language segment, such as from previous parts of the conversation, phrases or topics commonly used by the natural language provider or by other users identified as having one or more similar characteristics as the natural language provider (e.g., location, age, gender, education level, community type, etc.), phrases or topics associated with the natural language provider other than from the words used in the conversation, etc. For example, process 800 can select seed phrases based on associations between the natural language provider and a topic (e.g., work place, education institution, friend's name, interests, places visited, etc.) specified in a social graph or otherwise known by via a social media platform.

At block 806, process 800 can obtain one or more boosts from a contextual language model. A contextual language model can be a machine learning model, an algorithm (e.g., phrase matching), or a third-party provider that receives one or more seed phrases and/or contextual information and returns associated phrases or topics. For example, the contextual language model can be a machine learning model trained to identify words that commonly appear in conjunction with other words and/or contextual signals. As another example, the contextual language model can be an interface to one or more language providers that can receive phrases and/or contextual information and provide related phrases. Such language providers can be a Wiki, social media platform, search engine, news outlet, etc. that search their repositories for associated phrases when provided key terms or contextual information (e.g., as phrases or as categorized meta-data). The related phrases can be identified based on various models and algorithms, such as co-occurrences in text, incoming and outgoing web links, social media connections between people (e.g., "friends"), popularity of content, various machine learning models, etc. Some examples of contextual information that a contextual language model may use are signals associated with the natural language provider, such as location, age, gender, job, education, time, social media friends, etc. and/or signals specifying a context of the natural language interface that provided the natural language segment, such as whether the natural language interface is used by the natural language provider for work or social conversations. In some implementations, the contextual information can include input, from the natural language provider or another participant of the conversation, in modalities other than natural language, such as gestures or eye position identified by an artificial reality system or facial expressions.

In some implementations, process 800 can select language providers to use for determining boosts based on similar contextual factors. For example, contextual factors determine weights for selecting language providers or sets of contextual factors can be mapped to different language providers. As a more specific example, a work natural language interface can be mapped to an instant message language provider that searches a history of work conversations while a natural language interface used for social conversations can be mapped to a language provider that searches social media posts. Selected language providers can receive phrases and/or context signals and can provide related phrases or topic boosts. In some implementations, the boosts can be provided with weights indicating an amount of similarity or dissimilarity to the seed phrases, indicting an amount to favor or disfavor the phrase by a machine learning model. In some implementations, boosts can be synonym groups. For example, if a seed phrase is "dog" and a corresponding boost phrases are "cat" and "veterinarian," the "cat" boost can apply to synonyms such as "feline" and "kitty," while the "veterinarian" boost can apply to synonyms such as "vet" or "animal doctor." Such synonyms can be selected, for example, based on a traditional thesaurus or using phrases embedded into a semantic vector space and selecting vectors that are no more than a threshold cosine distance from the vector of the boost phrase.

In some implementations, block 806 is performed prior to block 804 where, instead of using seed phrases, boosts are determined based only on contextual information, as described above.

At block 808, process 800 can determine whether portions of the received natural language segment need further transcription. In various implementations, this determination can be made for portions of the transcription with lower than threshold transcription confidence value or for portions of the transcription associated with a language type that often is incorrectly transcribed (e.g., proper nouns) and that has not yet been transcribed with boosts. If any such portions are identified, process 800 can proceed to block 810 where the boosts from block 806 are provided to the transcription service to be transcribed, at block 814, with the boost probability modifications. If no such portions are identified, process 800 can proceed to block 812.

At block 812, process 800 can generate one or more intents using the boosts obtained at block 806. As discussed above, an intent specifies at least an identified topic for a natural language segment and can also specify a relationship between the topics based on relationships or categories identified for parts of the natural language segment. Process 800 can identify intents by identifying topics from the transcribed natural language segment. In some implementations, process 800 can accomplish this using a document understanding model and/or parts of speech tagging model as described above in relation to FIG. 5. In other implementations, a different model can be used, such as a model trained to select topics from natural language segment, or other algorithm can be used, such as an algorithm that selects certain types of phrases (e.g., the subject of a sentence, a phrase that other phrases in the sentence refer to, etc.), selects phrases that are used more frequently in a language corpus, or selects phrases that relate to previous natural language segments of the conversation. Where the selection is accomplished using one or more machine learning models, the selection can use the boosts determined at block 806 to increase the probability of the model selecting topics that are synonyms of the boost phrase. If block 806 was entered more than once, the boosts used at block 812 can be, in various implementations, all boosts, boosts that were used to make a modification during transcription, or boosts selected in the most recent iteration of the 804-810 loop.

At block 814, process 800 can obtain context signals for natural language segment and/or for the conversation. This data can include, e.g., people (such as from a social graph, employer human resources database, organization roster, event attendance list, etc.), a location (such as a current or previously identified location for one or more conversation participants, or a location referenced by one of more of the participants), a time the natural language segment was provided, a history of the conversation (e.g., phrases used, previous intents identified, statistics about engagement by various participants, etc.), statistics on types of language or phrases used natural language provider, a history of content items a conversation participant interacted with (e.g., in search results, on social media, in a web browser or through an app, etc.), a type of relationship between conversation participants (e.g., whether this conversation is for work, is among friends, is by people that are not familiar with each other), etc.

At block 816, process 800 can select one or more content items from an output provider based on the intents from block 812 and, in some cases, the context signals from block 814. An output provider can be a system that can search for content items based on at least a topic (e.g., keywords or tags, embeddings, phrases, category identifiers, etc.). In various implementations, output providers can be internal (e.g., content item databases) or third-party providers. Examples of output providers include image search systems, map providers, Wikis, traditional search engines, a system that can pull content from an identified website (e.g., where the context specifies one or more websites associated with the conversation), a work data store (e.g., human resources, shared drives, conversation or work logs, etc.), social media content (e.g., social media user uploaded content, social graph identifications, events, news items, advertisements, etc.), a cloud storage provider (either available to the public or where a conversation participant has provided access to a private storage system), etc. In some implementations, process 800 can use a machine learning model to select content from one of these sources, similarly to the matching performed at block 514. For example, a machine learning model can receive a representation of one or more intents and a vector of the context signal data and determine a corresponding point in a content item embedding space and select content items with similar (above a threshold) mapping in the embedding space. As another example, the machine learning model can receive a representation of one or more intents and a vector of the context signal data, can determine one or more corresponding categories, and can select content items tagged with at least a threshold amount of those categories.

Where process 800 connects to one or more external system output providers to obtain content items, process 800 can provide one or more intents, and may also provide context signals, and receives back one or more content items. In some implementations, the output providers can be associated with various categories of contexts, and process 800 can select the output providers to receive the intents (and in some cases the context signals) based on the output providers that best match the context. For example, a context signal can specify that the conversation is about work or between co-workers, and process 800 can select an output provider for work situations or that matches the specific workplace of the conversation participants. In some cases, output providers can also provide confidence values, allowing process 800 to rank the received content items to determine which should be included in the natural language interface of the conversation. In some implementations, process 800 can also rank provided content items from output providers in other ways, e.g., by using phrase matching, by applying an internal machine learning model, etc.

At block 818, process 800 can add the content items selected at block 816 to a user interface. In various implementations, this can include one or more of: displaying a visual content item (e.g., image, video, interactive UI such as a map, buttons or links, spreadsheet, or document, etc.), playing audio, providing haptic feedback (e.g., in relation to an artificial reality environment), etc. In some implementations, the content item is added to a natural language interface hosting the conversation. For example, where the natural language interface is a 2D screen, the content items can be shown in a designated window, as an overlay to the conversation, incorporated in a text thread of the conversation, etc. As another example, where the natural language interface is an artificial reality environment, selected content items can be provided as objects in the environment, e.g., in spatial relation to the natural language provider, the natural language provider's avatar, or orientated to a virtual space in which the conversation is taking place. In some implementations, the artificial reality environment can be configured to provide content items of different types in specified ways, such as by providing a virtual web browser to show websites, showing a table map for geographical maps, converting videos to 3D environments for the user to view and enter, etc.

In various implementations, a content item can be provided automatically to all conversation participants or can first be provided to the natural language provider that produced the natural language segment that resulted in the content item, allowing the natural language provider to select whether to provide it to other participants. For example, if a conversation participant said, "Sure, I'll share with you that photo from our river trip last week," process 800 may select the indicated photo from the natural language provider's cloud storage system and provide the natural language provider with an option to send it to the other conversation participant. This gives the natural language provider the option to screen content items, particularly where a content item was selected from a source private to the natural language provider, such as her social media pictures or cloud or local storage. In some implementations, the selected content item(s) can be formatted for a social media post, which can be automatically posted or presented to the natural language provider with the option to post on a social media platform. In yet further implementations, process 800 can analyze the selected content items to determine parts of the content items that best match the intents and can highlight or otherwise accentuate those relevant portions.

As the conversation progresses and more natural language segments are provided by the conversation participants, process 800 can repeat to selected additional content items. These content items can be added to or can replace content items previously used to augment the conversation. As with the story conversations, subsequent selections of content items can be influenced by previous selected content items, determined intents, and/or context signals. For example, if a first natural language provider provides the natural language segment "let's go swimming," a "go swimming" intent can be determined, causing a map content item to be displayed with local swimming spots. If another natural language provider then provides the natural language segment "I like Shady Point Beach," process 800 can determine an intent "Shady Point Beach" and update the displayed content item map to refine the map to accentuate the location of Shady Point Beach.

Figure 9:
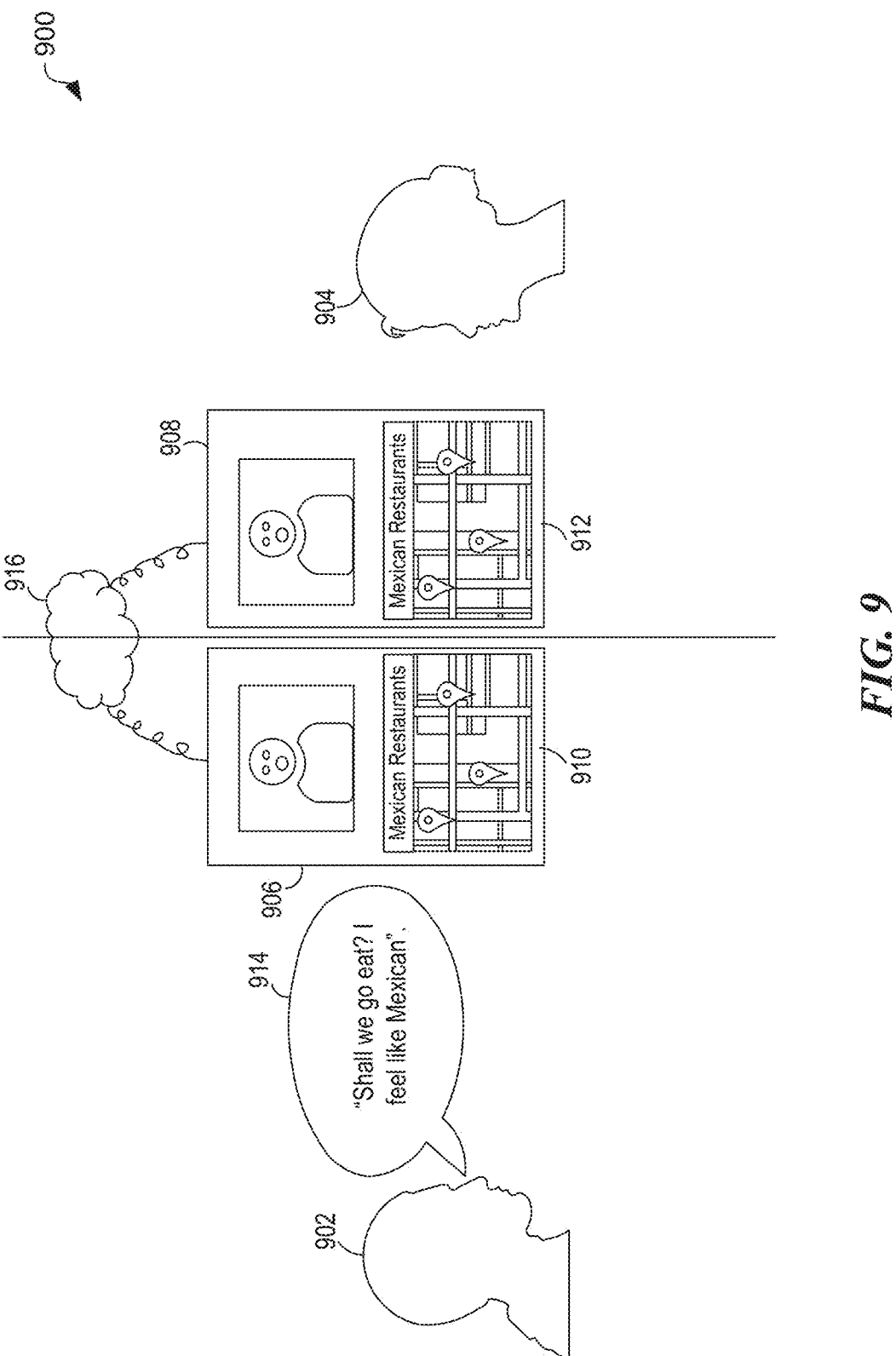
FIG. 9 is a conceptual diagram illustrating an example of a map content item, used to automatically augment an unstructured conversation from the example of FIG. 10.

FIG. 9 is a conceptual diagram illustrating an example 900 of a map content item, used to automatically augment an unstructured conversation from the example of FIG. 10. Example 900 includes conversation participants 902 and 904, who are holding an unstructured conversation via video chat on devices 906 and 908. In the conversation, participant 902 is a natural language provider providing natural language segment 914 "Shall we go eat? I feel like Mexican." Computing device 906 captures the audio of natural language segment 914 and sends it to a server in network 916. The server performs process 800 (as illustrated below in FIG. 10) and selects a map content item with parameters for the map to be of an area local to the natural language provider 902 with the location search term "Mexican restaurant." The resulting map content item is automatically displayed, in real-time, in the natural language interface of both devices 906 and 908, in areas 910 and 912.

Figure 10A:
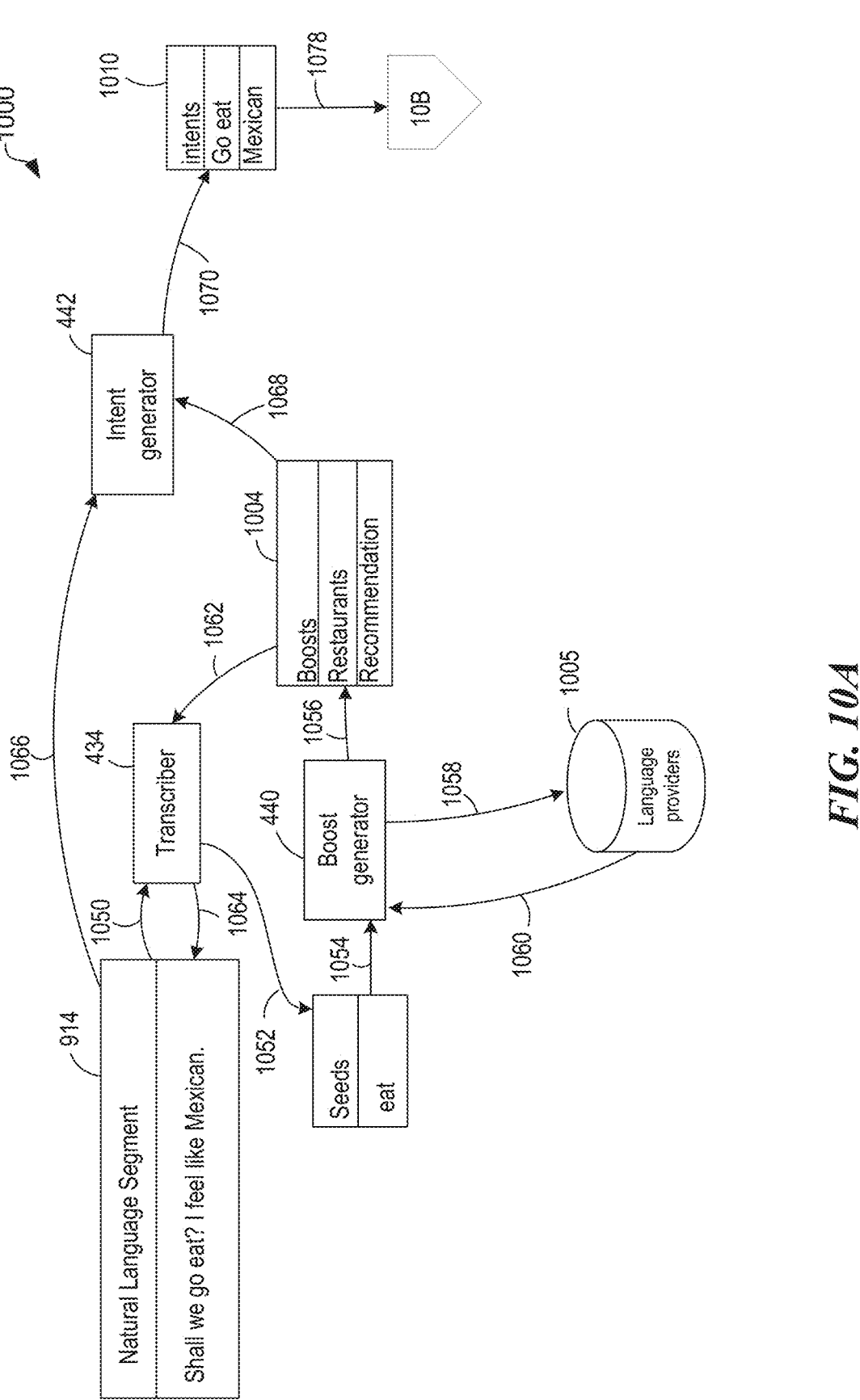
FIGS. 10A and 10B are conceptual diagrams illustrating an example of real-time augmentation of an unstructured conversation with content items based on natural language from the conversation.

FIGS. 10A and 10 B are conceptual diagrams illustrating an example 1000 of real-time augmentation of an unstructured conversation with content items based on natural language from the conversation. Example 1000 includes, from example 900 of FIG. 9, the natural language segment 914 and the computing device 906 with content item area 910; includes, from components 400, transcriber 434, boost generator 440, intent generator 442, context identifier 450, content item mapper 446 (with output provider interfaces 452), and conversation integrator 454; and further introduces language providers 1005, social media content item source 1006, conversation parameters 1008, and output providers 1014.

In operation, example 1000 begins with receiving natural language segment 914, which is passed to transcriber 434 at step 1050. Transcriber 434 identifies some words from natural language segment 914 which, at step 1052, are provided as seeds 1002. In example 1000, the seed "eat" is identified based on being a high confidence transcription from transcriber 434. At step 1054, the seeds 1002 are provided to boost generator 440. The boost generator 440 provides, at step 1058, the seeds to language providers 1005. In example 1000, the language providers 1005 identify boosts using a machine learning model that receives phrases and identifies boosts and that was trained using training items identified based on search results selected for search terms in combination with webpage importance values determined based on counts of incoming links. At step 1060, the language providers 1005 return boosts 1004, which include "restaurant" and "recommendation" boosts. At step 1062, boosts 1004 are provided to transcriber 434, which re-transcribes natural language segment 914 with probabilities modified based on the boosts 1004.

At steps 1066 the transcribed natural language segment 914 is provided to intent generator 442 and at step 1068 the boosts 1004 are also provided to the intent generator 442. Intent generator 442 includes one or more machine learning models (with outcomes modified by boosts 1004) to select intents corresponding to the natural language segment 914. In example 1000, intent generator 442 provides at step 1070, intents 1010 corresponding to "go eat" and "Mexican."

At step 1074, content from a social media provider 1006 provides contextual signals related to the conversation participants. In example 1000, the contextual signals provided at step 1074 include "check ins" to locations for the natural language provider, specified in a social graph of the social media provider, which include multiple Mexican restaurants. At step 1076, conversation parameters are provided, from conversation parameters storage 1008, which in this example include a geographical location for each of the conversation participants, ages and genders for the conversation participants, an identified setting of "work" for the conversation, and a history of the conversation. At step 1072, context identifier 450 provides the context signals 1012 from the context providers 1006 and 1008.

Figure 10B:
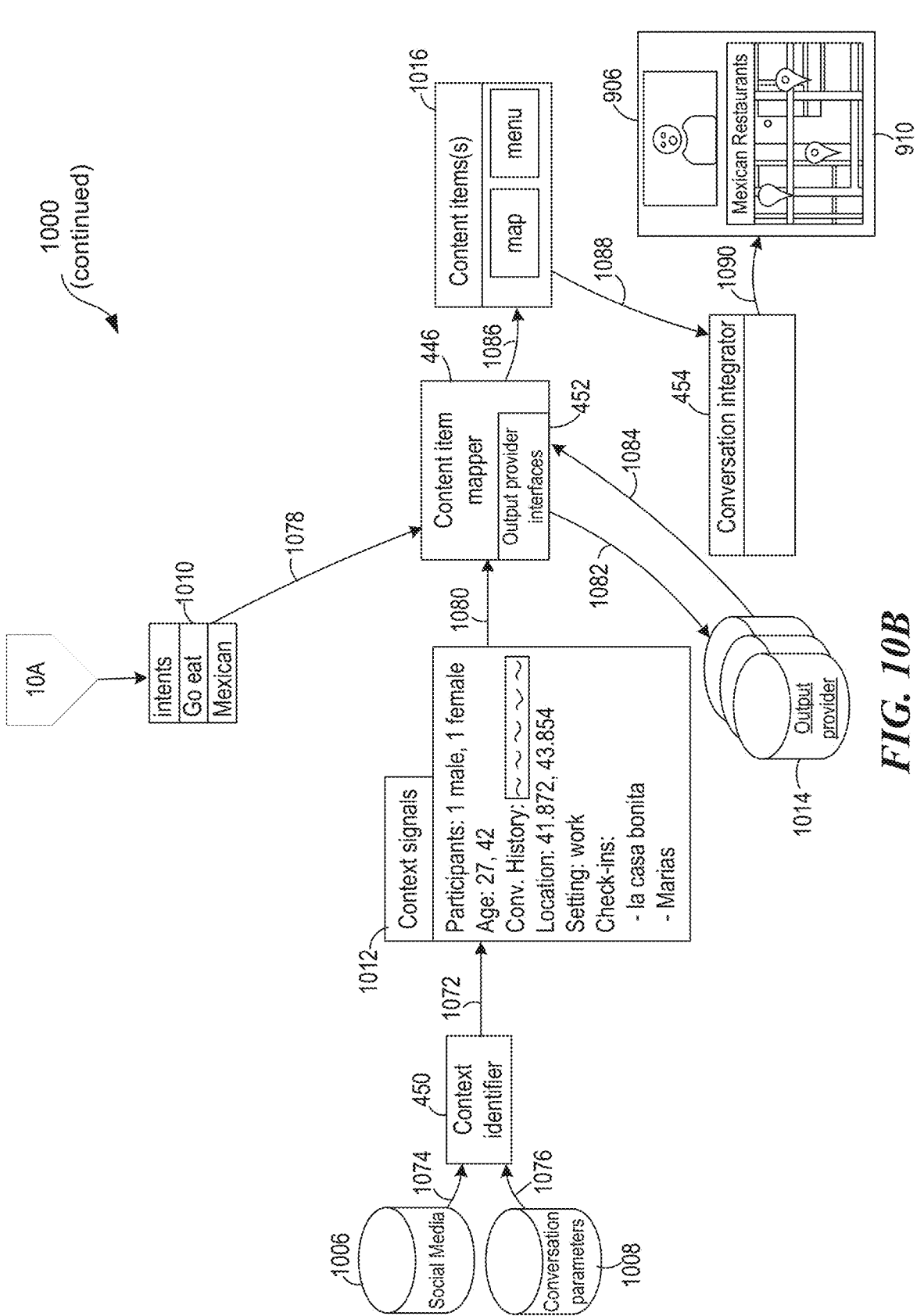

At step 1078, example 1000 continues to FIG. 10B where the intents 1010 are provided to content item mapper 446 and at step 1080, context signals 1012 are also provided to content item mapper 446. Content item mapper 446 uses the context signals 1012 to rank output providers 1014 according to how likely each output provider is to produce the most relevant content items for the context. Content item mapper 446 then uses output provider interfaces 452 to provide, at step 1082, the intents 1010 and the context signals 1012 to the top ranked output providers of output providers 1014.

The selected output providers use the intents and context signals to search content item stores for matching content items which are returned to content item mapper 446 at step 1084, along with confidence scores indicating a level of match to the intents and context signals. Content item mapper 446 selects, from the returned content items, the results from the output providers with confidence scores above a threshold and provides such content items 1016 at step 1086. Content items 1016 include, for example, a map showing Mexican restaurants near the conversation participants (which a mapping output provider of output providers 1014 selected based on the conversation participant location context signals and the intent of Mexican) and includes a menu from a local restaurant (which a review service output provider of output providers 1014 selected based on the conversation participant location context signals and both the "go eat" and "Mexican" intents).

At step 1088, the content items 1016 are provided to conversation integrator 454. Conversation integrator 454 determines that the map content item fits best with the natural language interface of the conversation, and integrates, at step 1090, the map into area 910 on the user interface of computing device 906. Conversation integrator 454 also integrates the map into area 912 on the user interface of computing device 908 (not shown).

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of adding one or more content items to a display, the method comprising:

obtaining audio content comprising user speech corresponding to one or more user intentions;

generating one or more intents, associated with a first portion of the user speech and identifying at least one of the one or more user intentions from the user speech, by applying a machine learning model to the first portion of the user speech;

automatically identifying one or more search constraints, corresponding to the at least one user intention from the user speech, by matching the one or more intents to the one or more search constraints;

obtaining the one or more content items by matching, using matching limits defined based at least in part on the one or more search constraints, at least some of the one or more intents to the one or more content items; and augmenting the display with the one or more content items.

2. The method of claim 1, wherein generating the one or more intents comprises identifying and tagging parts-of-speech associated with the first portion of the speech.

3. The method of claim 1, further comprising:

transcribing the audio content to obtain a natural-language representation of the speech.

4. The method of claim 1, wherein:

the at least one, of the one or more search constraints, is at least one first constraint; and at least one second constraint, of the one or more search constraints, defines the one or more content items matched with the one or more intents.

5. The method of claim 1, wherein the display is a display of an artificial reality device, and the one or more content items comprise virtual content to display on the artificial reality device during playback of the user speech.

6. The method of claim 1, wherein the matching uses the machine learning model trained to select the one or more content items based at least in part on corresponding classifications.

7. A non-transitory computer-readable storage medium storing instructions of adding one or more content items to a display, the instructions, when executed by a computing system, cause the computing system to:

obtain audio content comprising user speech corresponding to one or more user intentions;

generate one or more intents, associated with a first portion of the user speech and identifying at least one of the one or more user intentions from the user speech, by applying a machine learning model to the first portion of the user speech;

automatically identify one or more search constraints, corresponding to the at least one user intention from the user speech, by matching the one or more intents to the one or more search constraints;

obtain the one or more content items by matching, using matching limits defined based at least in part on the one or more search constraints, at least some of the one or more intents to the one or more content items; and augment the display with the one or more content items.

8. The non-transitory computer-readable storage medium of claim 7, wherein generate the one or more intents comprises identifying and tagging parts-of-speech associated with the first portion of the speech.

9. The non-transitory computer-readable storage medium of claim 7, wherein the instructions, when executed by the computing system, further cause the computing system to:

transcribe the audio content to obtain a natural-language representation of the speech.

10. The non-transitory computer-readable storage medium of claim 7, wherein:

the at least one, of the one or more search constraints, is at least one first constraint; and at least one second constraint, of the one or more search constraints, defines the one or more content items matched with the one or more intents.

11. The non-transitory computer-readable storage medium of claim 7, wherein the display is a display of an artificial reality device, and the one or more content items comprise virtual content to display on the artificial reality device during playback of the user speech.

12. The non-transitory computer-readable storage medium of claim 7, wherein the matching uses the machine learning model trained to select the one or more content items based at least in part on corresponding classifications.

13. A computing system of adding one or more content items to one or more displays, the computing system comprising:

the one or more displays;

one or more processors; and one or more memories storing instructions that, when executed by the one or more processors, cause the computing system to:

obtain audio content comprising user speech corresponding to one or more user intentions;

generate one or more intents, associated with a first portion of the user speech and identifying at least one of the one or more user intentions from the user speech, by applying a machine learning model to the first portion of the user speech;

automatically identify one or more search constraints, corresponding to the at least one user intention from the user speech, by matching the one or more intents to the one or more search constraints;

obtain the one or more content items by matching, using matching limits defined based at least in part on the one or more search constraints, at least some of the one or more intents to the one or more content items; and augment the one or more displays with the one or more content items.

14. The computing system of claim 13, wherein generate the one or more intents comprises identifying and tagging parts-of-speech associated with the first portion of the speech.

15. The computing system of claim 13, wherein:

the at least one, of the one of more search constraints, is at least one first constraint; and at least one second constraint, of the one or more search constraints, defines the one or more content items matched with the one or more intents.

16. The computing system of claim 13, wherein the one or more displays are displays of an artificial reality device, and the one or more content items comprise virtual content to display on the artificial reality device during playback of the user speech.

17. The computing system of claim 13, wherein the matching uses the machine learning model trained to select the one or more content items based at least in part on corresponding classifications.

* * * * *